US012656641B2

(12) United States Patent (10) Patent No.: US 12,656,641 B2

Walker et al. (45) Date of Patent: *Jun. 16, 2026

(54) BACK LIGHT UNIT FOR BACKLIT DISPLAYS

(71) Applicant: BrightView Technologies, Inc., Durham, NC (US)

(72) Inventors: Kenneth L. Walker, Semora, NC (US); Matthew K. Pope, Durham, NC (US)

(73) Assignee: BrightView Technologies, Inc., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/049,877

(22) Filed: Feb. 10, 2025

(65) Prior Publication Data

US 2025/0180947 A1 Jun. 5, 2025

Related U.S. Application Data

(60) Continuation of application No. 18/733,419, filed on Jun. 4, 2024, now Pat. No. 12,228,818, which is a (Continued)

(51) Int. Cl.
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133607* (2021.01);
(Continued)

(58) Field of Classification Search
CPC ......... G02F 1/133603; G02F 1/133605; G02F 1/133607; G02F 1/133611; G02F 1/13362
See application file for complete search history.

(56) References Cited

U.S. PATENT DOCUMENTS 3,179,796 A 4/1965 Rolph
3,829,680 A 8/1974 Jones
(Continued)

FOREIGN PATENT DOCUMENTS

CN 1502096 A 6/2004
CN 100578291 C 1/2010
(Continued)

OTHER PUBLICATIONS

Chang et al., "Fabrication and optical design of a pyramid microstructure for the base of a light guide used in backlight module" Journal of Micro/Nanolithography, MEMS, and MOEMS, vol. 9, Issue 4, Oct. 2010, Retrieved from: <<https://doi.org/10.1117/1.3517108>>, pp. 043006-0-043006-9.
(Continued)

*Primary Examiner* — Thomas M Sember
(74) *Attorney, Agent, or Firm* — Rauschenbach Patent Law Group, PLLC; Kurt Rauschenbach

(57) ABSTRACT

A BLU includes a 2D array of LEDs producing light with an angular distribution of nominally ±90 degrees around a center. A transparent solid material layer is positioned with a bottom surface over the 2D array of LEDs and configured to transform the light produced by the 2D array into light having an angular distribution of nominally less than ±90 degrees around the at a top surface of the transparent solid material layer. A diffuser film is positioned over the top surface of the transparent solid material layer configured to provide a FWHM of greater than 60 degrees and configured to diffuse the light produced at the top surface of the transparent solid material layer to produce diffused light at a top surface of the diffuser film. A BEF positioned over the top surface of the diffuser film and comprising a plurality of prism microstructures, where at least some prism microstructures have an apex angle of approximately ninety
(Continued)

*800* degrees. The BEF configured to narrow an angular optical distribution of the diffused light produced at the top surface of the diffuser film, thereby providing uniform and high brightness light output from the back light unit.

19 Claims, 31 Drawing Sheets

Related U.S. Application Data division of application No. 18/418,311, filed on Jan. 21, 2024, now Pat. No. 12,032,242.

(60) Provisional application No. 63/503,517, filed on May 22, 2023.

(52) U.S. Cl.
CPC .... *G02F 1/133611* (2013.01); *G02F 1/13362* (2013.01); *G02F 2202/022* (2013.01); *G02F 2202/13* (2013.01)

(56) References Cited

U.S. PATENT DOCUMENTS

| | | | |
|---|---|---|---|
| 5,997,156 A | 12/1999 | Perlo et al. |
| 7,072,096 B2 | 7/2006 | Holman et al. |
| 7,092,166 B1 | 8/2006 | Wood |
| 7,190,387 B2 | 3/2007 | Rinehart et al. |
| 7,192,692 B2 | 3/2007 | Wood et al. |
| 7,525,126 B2 | 4/2009 | Leatherdale et al. |
| 7,628,514 B2 | 12/2009 | Hsu et al. |
| 7,645,058 B2 | 1/2010 | Kurokawa et al. |
| 7,763,417 B2 | 7/2010 | Rinehart et al. |
| 7,845,826 B2 | 12/2010 | Aylward et al. |
| 7,867,695 B2 | 1/2011 | Freese et al. |
| 7,959,324 B2 | 6/2011 | Hsu |
| 7,969,085 B2 | 6/2011 | Cok |
| 7,991,257 B1 | 8/2011 | Coleman |
| 8,047,673 B2 | 11/2011 | Santoro |
| 8,128,257 B2 | 3/2012 | Wood |
| 8,134,657 B2 | 3/2012 | Nakagome et al. |
| 8,619,363 B1 | 12/2013 | Coleman |
| 8,662,687 B2 | 3/2014 | Weber et al. |
| 8,829,784 B2 | 9/2014 | Inoue et al. |
| 8,917,448 B2 | 12/2014 | Weber et al. |
| 8,974,069 B2 | 3/2015 | Purchase et al. |
| 8,988,776 B2 | 3/2015 | Weber et al. |
| 9,341,754 B2 | 5/2016 | Maekawa et al. |
| 9,431,632 B2 | 8/2016 | Inoue et al. |
| 9,483,965 B2 | 11/2016 | Zhou et al. |
| 9,513,426 B2 | 12/2016 | Hong et al. |
| 9,765,949 B2 | 9/2017 | Shen et al. |
| 9,817,178 B2 | 11/2017 | Fan |
| 10,072,816 B2 | 9/2018 | Shen et al. |
| 10,302,275 B2 | 5/2019 | Purchase |
| 10,317,583 B2 | 6/2019 | Purchase |
| 10,520,667 B2 | 12/2019 | Dhar |
| 11,300,268 B2 | 4/2022 | Purchase et al. |
| 11,360,350 B2 | 6/2022 | Tsai et al. |
| 11,391,437 B2 | 7/2022 | Shen et al. |
| 11,520,182 B2 | 12/2022 | Walker et al. |
| 11,531,232 B2 | 12/2022 | Aspell et al. |
| 11,655,957 B2 | 5/2023 | Shen et al. |
| 12,032,242 B1 | 7/2024 | Walker et al. |
| 12,228,818 B2 | 2/2025 | Walker et al. |
| 2001/0030805 A1 | 10/2001 | Sawaki et al. |
| 2002/0003593 A1 | 1/2002 | Arakawa et al. |
| 2003/0090804 A1 | 5/2003 | Kotchick |
| 2004/0051450 A1 | 3/2004 | George et al. |
| 2004/0061959 A1 | 4/2004 | Kim |
| 2004/0190102 A1 | 9/2004 | Mullen et al. |
| 2005/0122591 A1 | 6/2005 | Parker et al. |
| 2005/0265029 A1 | 12/2005 | Epstein et al. |
| 2006/0077692 A1 | 4/2006 | Noh et al. |
| 2006/0163988 A1 | 7/2006 | Kang et al. |
| 2006/0250707 A1 | 11/2006 | Whitney et al. |
| 2007/0086086 A1 | 4/2007 | Cassarly et al. |
| 2007/0097709 A1 | 5/2007 | Hsieh |
| 2007/0284565 A1 | 12/2007 | Leatherdale et al. |
| 2008/0042552 A1 | 2/2008 | Cok |
| 2008/0094831 A1 | 4/2008 | Matsumoto |
| 2008/0247172 A1 | 10/2008 | Beeson et al. |
| 2009/0046478 A1 | 2/2009 | Wang et al. |
| 2009/0080220 A1 | 3/2009 | Chang |
| 2009/0262428 A1 | 10/2009 | Kurokawa |
| 2009/0290218 A1 | 11/2009 | Parker et al. |
| 2010/0033957 A1 | 2/2010 | Lin |
| 2010/0039808 A1 | 2/2010 | Purchase et al. |
| 2010/0265435 A1 | 10/2010 | Hwang et al. |
| 2010/0271840 A1 | 10/2010 | Hamada et al. |
| 2010/0321609 A1 | 12/2010 | Qi et al. |
| 2010/0328575 A1 | 12/2010 | Shinkai et al. |
| 2011/0019404 A1 | 1/2011 | Chien et al. |
| 2011/0051047 A1 | 3/2011 | Oneill et al. |
| 2011/0128470 A1 | 6/2011 | Yorita et al. |
| 2011/0141412 A1 | 6/2011 | Lee et al. |
| 2011/0234580 A1 | 9/2011 | Wang et al. |
| 2011/0261584 A1 | 10/2011 | Boyd et al. |
| 2011/0310332 A1 | 12/2011 | Boyd et al. |
| 2012/0127397 A1 | 5/2012 | Yamamoto et al. |
| 2012/0176772 A1 | 7/2012 | Maekawa et al. |
| 2012/0257376 A1 | 10/2012 | Zhou et al. |
| 2013/0044513 A1 | 2/2013 | Pan |
| 2013/0070478 A1 | 3/2013 | Edamitsu et al. |
| 2013/0128571 A1 | 5/2013 | Yamazaki et al. |
| 2014/0000710 A1 | 1/2014 | Nakahara et al. |
| 2014/0168576 A1 | 6/2014 | Lee |
| 2014/0362556 A1 | 12/2014 | Cho et al. |
| 2014/0376220 A1 | 12/2014 | Shen et al. |
| 2015/0029717 A1 | 1/2015 | Shen et al. |
| 2015/0338567 A1 | 11/2015 | Stevenson et al. |
| 2015/0377451 A1 | 12/2015 | Yao et al. |
| 2016/0097889 A1 | 4/2016 | Kim et al. |
| 2016/0116663 A1 | 4/2016 | Hong et al. |
| 2016/0123547 A1 | 5/2016 | Geisler et al. |
| 2016/0231579 A1 | 8/2016 | Borovkov |
| 2016/0273721 A1 | 9/2016 | Pijlman et al. |
| 2016/0282523 A1 | 9/2016 | Liu |
| 2016/0320532 A1 | 11/2016 | Purchase |
| 2017/0031082 A1 | 2/2017 | Song et al. |
| 2017/0075052 A1 | 3/2017 | Saitoh et al. |
| 2017/0097448 A1 | 4/2017 | Wang et al. |
| 2017/0123139 A1 | 5/2017 | Huang et al. |
| 2017/0146214 A1 | 5/2017 | Purchase |
| 2017/0153383 A1 | 6/2017 | Lee et al. |
| 2017/0167679 A1 | 6/2017 | Yui et al. |
| 2017/0175976 A1 | 6/2017 | Johnson et al. |
| 2017/0269432 A1 | 9/2017 | Lee et al. |
| 2018/0252968 A1 | 9/2018 | Nakamura et al. |
| 2018/0329207 A1 | 11/2018 | Sitter et al. |
| 2019/0196270 A1 | 6/2019 | Hori et al. |
| 2019/0227382 A1 | 7/2019 | Watanabe et al. |
| 2019/0265549 A1 | 8/2019 | Chen et al. |
| 2019/0278134 A1 | 9/2019 | Okamoto et al. |
| 2019/0278135 A1 | 9/2019 | Woodgate et al. |
| 2020/0025562 A1 | 1/2020 | Saito |
| 2020/0049877 A1 | 2/2020 | Watanabe et al. |
| 2020/0089058 A1 | 3/2020 | Gao et al. |
| 2020/0176650 A1 | 6/2020 | Achi et al. |
| 2020/0249529 A1 | 8/2020 | Yamada et al. |
| 2020/0259307 A1 | 8/2020 | Sharma et al. |
| 2020/0341183 A1 | 10/2020 | Yonemoto et al. |
| 2020/0379160 A1 | 12/2020 | Meng et al. |
| 2020/0386919 A1 | 12/2020 | Arima et al. |
| 2020/0408383 A1 | 12/2020 | Shen et al. |
| 2021/0072598 A1 | 3/2021 | Walker et al. |
| 2021/0156539 A1 | 5/2021 | Purchase et al. |
| 2021/0231290 A1 | 7/2021 | Aspell et al. |
| 2021/0232004 A1 | 7/2021 | Aspell et al. |
| 2021/0262621 A1 | 8/2021 | Eom |
| 2021/0271133 A1 | 9/2021 | Zhang et al. |
| 2022/0004058 A1 | 1/2022 | Tsai et al. |

(56) References Cited

U.S. PATENT DOCUMENTS

| | | |
|---|---|---|
| 2022/0043307 A1 | 2/2022 | Walker et al. |
| 2022/0075229 A1 | 3/2022 | Walker et al. |
| 2022/0197086 A1 | 6/2022 | Walker et al. |
| 2022/0214023 A1 | 7/2022 | Purchase et al. |
| 2022/0307672 A1 | 9/2022 | Shen et al. |
| 2022/0326571 A1 | 10/2022 | Tsai et al. |
| 2023/0061049 A1 | 3/2023 | Walker et al. |
| 2023/0142417 A1 | 5/2023 | Allen et al. |
| 2023/0168540 A1 | 6/2023 | Yasunaga et al. |
| 2024/0393639 A1 | 11/2024 | Walker et al. |

FOREIGN PATENT DOCUMENTS

| | | |
|---|---|---|
| CN | 101896839 A | 11/2010 |
| CN | 102007434 A | 4/2011 |
| CN | 103460081 A | 12/2013 |
| CN | 102859272 B | 1/2014 |
| CN | 205480452 U | 8/2016 |
| CN | 105934627 A | 9/2016 |
| CN | 106646720 A | 5/2017 |
| CN | 107966856 A | 4/2018 |
| CN | 109188772 A | 1/2019 |
| CN | 110998176 A | 4/2020 |
| CN | 111670317 A | 9/2020 |
| CN | 113260815 A | 8/2021 |
| CN | 114556201 A | 5/2022 |
| EP | 3645937 A1 | 5/2020 |
| EP | 3746696 A1 | 12/2020 |
| EP | 4028830 A1 | 7/2022 |
| JP | 2004-524556 A | 8/2004 |
| JP | 2005-241919 A | 9/2005 |
| JP | 2008-515026 A | 5/2008 |
| JP | 2008-242269 A | 10/2008 |
| JP | 2009-086031 A | 4/2009 |
| JP | 2009-265616 A | 11/2009 |
| JP | 2010-044378 A | 2/2010 |
| JP | 2010-123551 A | 6/2010 |
| JP | 2011-076115 A | 4/2011 |
| JP | 2011-123379 A | 6/2011 |
| JP | 2011-150077 A | 8/2011 |
| JP | 2011-243518 A | 12/2011 |
| JP | 2012-018880 A | 1/2012 |
| JP | 2012-069282 A | 4/2012 |
| JP | 2012-094266 A | 5/2012 |
| JP | 2012-114003 A | 6/2012 |
| JP | 2012-234047 A | 11/2012 |
| JP | 2012-242764 A | 12/2012 |
| JP | 2013-030404 A | 2/2013 |
| JP | 5167993 B2 | 3/2013 |
| JP | 2016-539463 A | 12/2016 |
| JP | 2020-526874 A | 8/2020 |
| JP | 2021-512455 A | 5/2021 |
| KR | 2002-0061802 A | 7/2002 |
| KR | 10-2003-0080764 A | 10/2003 |
| KR | 10-2009-0040363 A | 4/2009 |
| KR | 10-2014-0016123 A | 2/2014 |
| KR | 10-2020-0026909 A | 3/2020 |
| KR | 10-2020-0115510 A | 10/2020 |
| KR | 2022-0062028 A | 5/2022 |
| WO | 2002/057816 A1 | 7/2002 |
| WO | 2002/075706 A2 | 9/2002 |
| WO | 2003/056876 A2 | 7/2003 |
| WO | 2005/083317 A1 | 9/2005 |
| WO | 2006/073916 A1 | 7/2006 |
| WO | 2006/121690 A1 | 11/2006 |
| WO | 2010/141261 A2 | 12/2010 |
| WO | 2012/015013 A1 | 2/2012 |
| WO | 2012/138898 A1 | 10/2012 |
| WO | 2015/062863 A1 | 5/2015 |
| WO | 2018/006288 A1 | 1/2018 |
| WO | 2018/155304 A1 | 8/2018 |
| WO | 2019/006288 A1 | 1/2019 |
| WO | 2019/067095 A1 | 4/2019 |
| WO | 2019/082856 A1 | 5/2019 |
| WO | 2019/152382 A1 | 8/2019 |
| WO | 2020/142362 A1 | 7/2020 |
| WO | 2021/050523 A1 | 3/2021 |
| WO | 2021/150813 A1 | 7/2021 |
| WO | 2022/133080 A1 | 6/2022 |
| WO | 2024/242910 A1 | 11/2024 |

OTHER PUBLICATIONS

Chen, et al., "74-1: Invited Paper: Can LCDs Outperform OLED Displays in Ambient Contrast Ratio?", SID Symposium Digest of Technical Papers, vol. 49, May 30, 2018, pp. 981-984.

Chen, et al., "Liquid Crystal Display and Organic Light-emitting Diode Display: Present Status and Future Perspectives", Light: Science & Applications, vol. 07, Article No. 17168, pp. 1-13.

Chien et al., "Fabrication of integrated light guiding plate for backlight system" Proceedings vol. 6109, Micromachining and Microfabrication Process Technology XI, Retrived from <<https://doi.org/10.1117/12.647115>>, Jan. 23, 2006, pp. 610909-1-610909-8.

First Notification received for Chinese Patent Application No. 202421129412.0, mailed on Feb. 6, 2025, 1 page.

International Search Report and Written Opinion received for PCT Application No. PCT/US2024/029010, mailed on Sep. 3, 2024, 9 pages.

Kim, et al., "Wideband Antireflective Circular Polarizer Exhibiting a Perfect Dark State in Organic Light-emitting-diode Display", Optics Express, vol. 22, Suppl. 7, Dec. 15, 2014, pp. A1725-A1730.

Pancharatnam, S., "Generalized Theory of Interference, and Its Applications. Part I. Coherent Pencils", Proceedings of the Indian Academy of Sciences, vol. 44, No. 5, Section A, 1956, pp. 247-262.

Second Notification received for Chinese Patent Application No. 202421129412.0, mailed on Feb. 13, 2025, 1 page.

Vieri, et al., "3-2: Distinguished Paper: An 18 Megapixel 4.3" 1443 ppi 120 Hz OLED Display for Wide Field of View High Acuity Head Mounted Displays", SID Symposium Digest of Technical Papers, vol. 49, Issue 1, May 2018, pp. 5-8.

International Preliminary Report on Patentability received for PCT Application No. PCT/US2024/029010, mailed on Dec. 4, 2025, 6 pages.

Office Action received for Chinese Patent Application No. 202521093649.2, mailed on Jan. 15, 2026, 2 pages including 1 page of English Translation.

190

200

400

| Product Number | Distance To Achieve Complete LED Hiding (Distance Between LEDs:Air Gap) |
|---|---|
| C-HE15 | 1:4 |
| C-HE20 | 1:3.5 |
| C-HE30 | 1:2.5 |
| C-HE40 | 1:2.3 |
| C-HE55 | 1:2 |
| C-HE80 | 1:1.5 |
| C-HE90 | 1:1.3 |

| Product Number | Distance To Achieve Complete LED Hiding (Distance Between LEDs:Air Gap) |
|---|---|
| C-HH20 | 1:2.5 |
| C-HH30 | 1:2.3 |
| C-HH40 | 1:2 |
| C-HH55 | 1:1.5 |
| C-HH80 | 1:1 |
| C-HH90 | 1:0.85 |

| Product Number | Distance To Achieve Complete LED Hiding (Distance Between LEDs:Air Gap) |
|---|---|
| V-H08O | 1:0.90 |
| V-H105 | 1:0.75 |

500

Mean Divergence Over All Phi (°)

630

650

700

710

750

760

770

780

*820*

PMMA

*840*

*1100*

*1120*

1200

1212 — Brightness Enhancement Film
1210 — Brightness Enhancement Film
1202 — Diffuser Film
1207 — d
1208 — LED
x ~1205
1204
1206 Transparent Material

1220

BACK LIGHT UNIT FOR BACKLIT DISPLAYS

CROSS-REFERENCE TO RELATED APPLICATION

The present application is a continuation of U.S. patent application Ser. No. 18/733,419, entitled "Back Light Unit for Backlit Displays", filed on Jun. 4, 2024, now granted as U.S. Pat. No. 12,228,818 on Feb. 18, 2025, which is a divisional of U.S. patent application Ser. No. 18/418,311, entitled "Back Light Unit for Backlit Displays", filed on Jan. 21, 2024, now granted as U.S. Pat. No. 12,032,242 on Jul. 9, 2024, which claims benefit of U.S. Provisional Patent Application Ser. No. 63/503,517, entitled "Back Light Unit for Backlit Displays", filed on May 22, 2023. The entire contents of U.S. Pat. Nos. 12,228,818 and 12,032,242, and U.S. Provisional Patent Application No. 63/503,517 are herein incorporated by reference.

The section headings used herein are for organizational purposes only and should not to be construed as limiting the subject matter described in the present application in any way.

INTRODUCTION

The present teaching generally relates to technologies for back light units used in backlit displays. Display technology is rapidly evolving in efforts to improve display image quality. In particular, liquid crystal displays (LCDs) are increasingly deploying back light unit architectures to improve image quality. It is highly desirable to have improved back light units for this and other applications. For example, mini LED is becoming an important back light technology for new high dynamic range (HDR) LCD displays including monitors, mobile phones and tablets. An advantage of these displays and associated back light units (BLUs) is localized dimming, where individual LEDs in the BLU can turn on and off to create higher contrast ratios required to support HDR as compared, for example, to edge-lit LEDs. Such systems provide local dimming for richer contrast and darker blacks, lower power, ultra-high brightness high reliability and no burn in as compared, for example, to OLED displays. Applications for these displays include, for example, automotive displays, laptops, desktops, tablets, and specialty and custom displays.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale; emphasis instead generally being placed upon illustrating principles of the teaching. The drawings are not intended to limit the scope of the Applicant's teaching in any way.

FIG. 4A illustrates a table related to embodiments of diffuser layers including a single-sided coating according to the present teaching.

FIG. 4B illustrates a table related to embodiments of diffuser layers including a double-sided coating according to the present teaching.

DESCRIPTION OF VARIOUS EMBODIMENTS

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

Figure 1A:
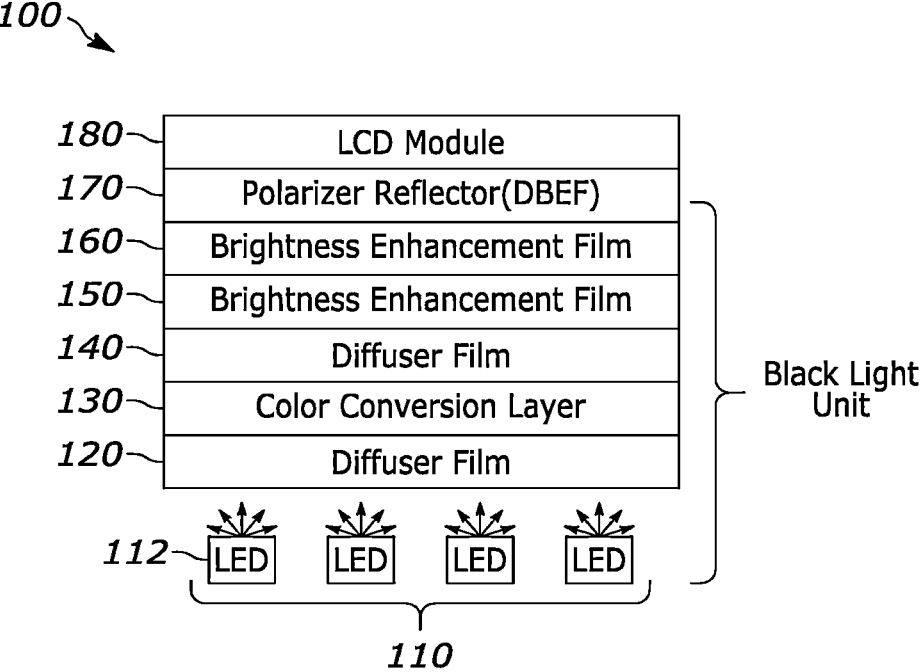
FIG. 1A illustrates a schematic illustration of an embodiment of a back light unit architecture that includes an array of Light Emitting Diodes (LEDs) for a Liquid Crystal Display (LCD) of the present teaching.
Figure 1B:
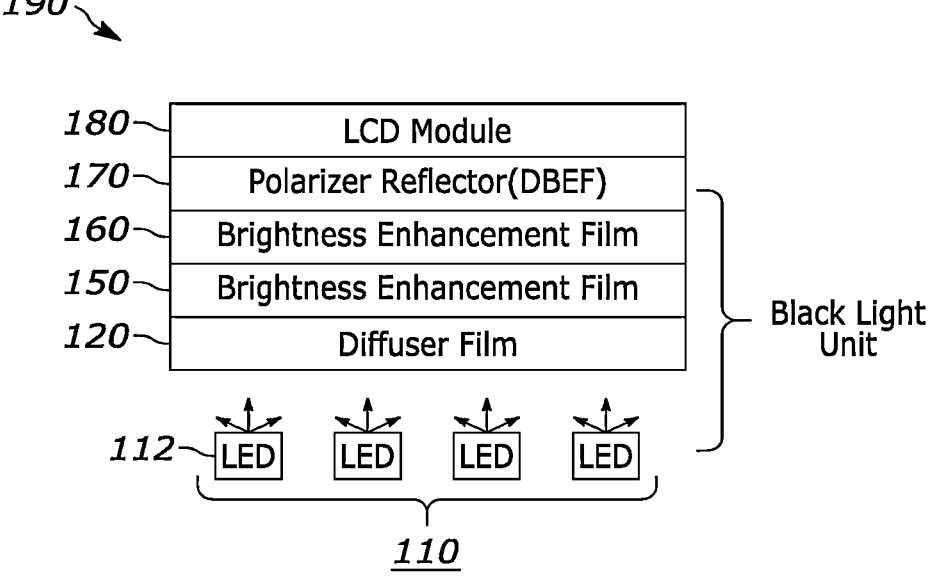
FIG. 1B illustrates a schematic diagram of another embodiment of a back light unit architecture that includes an array of Light Emitting Diodes (LEDs) for a Liquid Crystal Display (LCD) of the present teaching.

In pursuit of improved image quality, various thin displays including, for example, liquid crystal displays, are increasingly using back light unit architectures. The present teaching relates to back light units for backlit displays having two-dimensional arrays of light emitting diode (LED) light sources. FIGS. 1A and 1B show schematic illustrations of back light units that include an array of LEDs for a Liquid Crystal Display (LCD). FIG. 1A illustrates a schematic illustration of an embodiment of a back light unit architecture that includes an array of LEDs for a LCD of the present teaching.

Figure 2A:
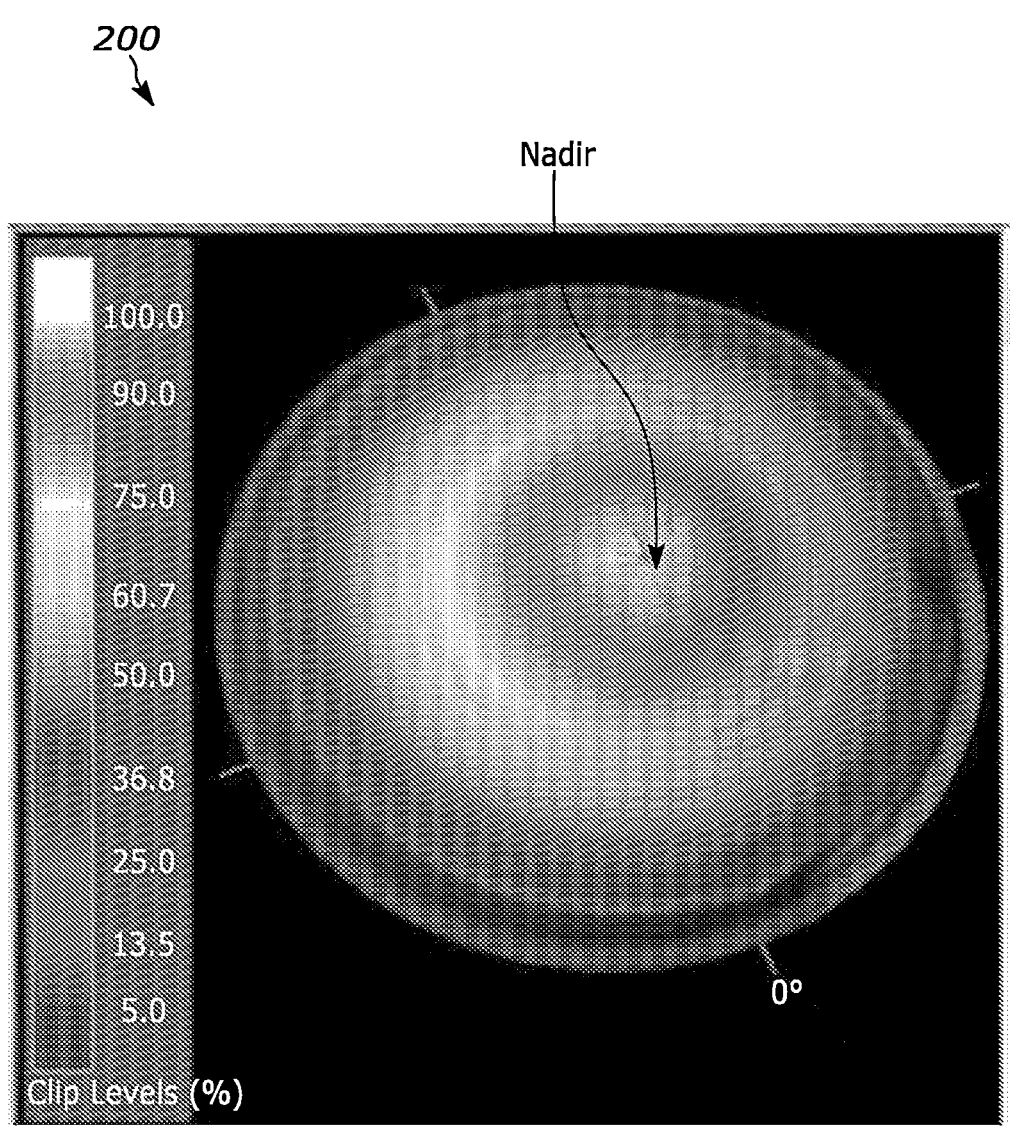
FIG. 2A illustrates a three-dimensional plot of a distribution of light generated by a known LED as a function of angle, as measured by a goniophotometer.
Figure 2B:
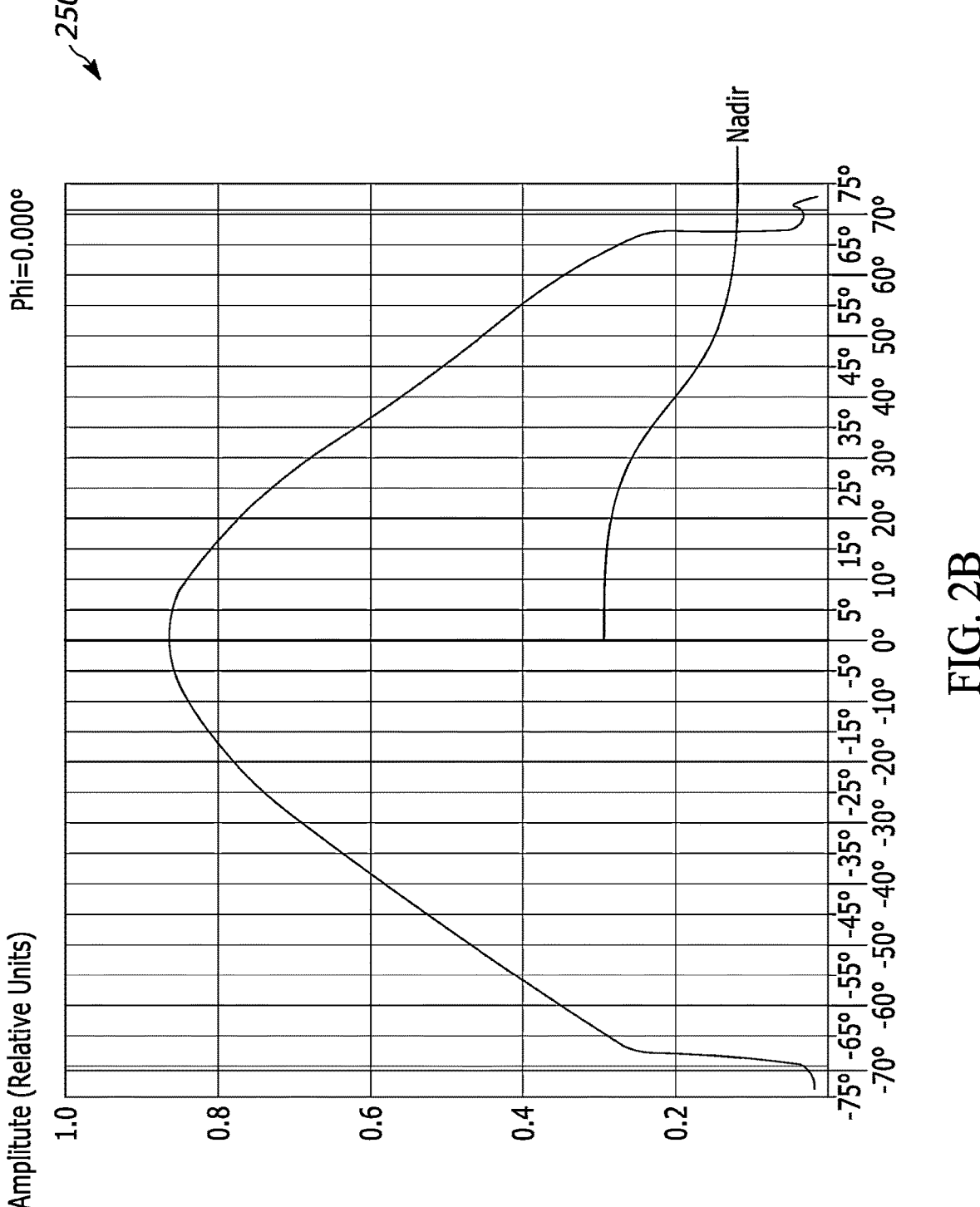
FIG. 2B illustrates the measured light distribution of the illumination pattern described in connection with FIG. 2A represented in two dimensions.

Referring to FIG. 1A, the back light unit architecture 100 can include of an array 110 of individual LEDs 112, which for example can be blue LEDS, white LEDs, and/or red-green-blue LED clusters. Any variety of known LEDs can be used in connection with the present teaching. FIG. 2A illustrates a three-dimensional plot of a distribution of light generated by a known LED as a function of angle, as measured by a goniophotometer. FIG. 2B illustrates the measured light distribution of the illumination pattern described in connection with FIG. 2A represented in two dimensions. FIGS. 2A and 2B illustrate a typical intensity distribution of light emitted from a single LED as a function of angle, as measured by a goniophotometer. As illustrated, the LED source approximates a Lambertian source. By Lambertian source we mean a source that emits a substantially symmetrical light distribution relative to the nadir. This corresponds to the highest intensity of light being at the nadir. In general, the light emission angle of a Lambertian source is 180 degrees, or ±90 degrees around center.

Returning again to FIG. 1A, a series of films, also referred to as layers, can be used to spread or diffuse the light emitted from the LEDs 112 so that the back light unit architecture 100 may deliver a more uniform light to the LCD module 180 containing the liquid crystals located above the back light unit. Some embodiments of back light units of the present teaching do not use LCD modules 180. Some embodiments of the present teaching use different lighting modules in place of the LCD module 180. In some embodiments, the back light unit architecture 100 includes a diffuser film 120. Various known diffuser films 120 can be used. Diffuser films 120 may also be referred to a diffuser layers or diffusers. For example, the diffuser film 120 can be a single-sided diffuser layer, a double-sided diffuser layer, a volumetric diffuser layer, and/or a circular diffuser. A color conversion layer 130 can be used, for example, if the LEDs 112 are emitting blue light. The color conversion layer 130 can use either quantum dots or phosphor material, for example, to convert some of the blue light emitted by the LEDs 112 to green and red light. A second diffuser film 140, which can be, for example, a volumetric diffuser or a circular diffuser resulting from a random textured surface, is configured to spread or diffuse the light exiting the color conversion layer 130. There are two brightness enhancement films (BEFs) 150, 160 positioned over the second diffuser film 140. In some embodiments only one brightness enhancement film 150, 160 is used. In some embodiments, the two brightness enhancement films 150, 160 are two prism films rotated approximately 90 degrees relative to each other. These two 90-degree rotated prism films together are also known as a pair of cross brightness enhancement films. A polarizer reflector 170, also referred to as a DBEF, is positioned over the brightness enhancement films 150, 160. In some embodiments, there may be additional films (not shown) in the back light unit architecture 100 that are used to improve the overall uniformity and brightness of the light being delivered to the LCD panel.

In some embodiments, the DBEF 170 (reflecting polarizer) film is either incorporated with the LCD module 180 or below the LCD module 180 as a separate film. In some back light units, white LEDs may be used without a color conversion layer 130. By using an array of LEDs 110, better contrast ratios can be achieved by adjusting the brightness of individual LEDs 112, often referred to as local dimming.

In general, consumers prefer that electronic devices that include LCDs evolve to become thinner and thinner. As a result, there is a need for the back light units of such displays to also become thinner and thinner. This presents a challenge that requires management of the light being emitted by the LEDs in an effective manner to ensure uniformity and brightness in a thinner back light unit.

FIG. 1B illustrates a schematic illustration of another embodiment of a back light unit architecture 190 that includes an array of Light Emitting Diodes (LEDs) for a Liquid Crystal Display (LCD) of the present teaching. For example, referring to the embodiment of an LCD display with back light unit architecture 190 of FIG. 1B, when a diffuser film 120 is placed over the array 110 of LEDs 112, the individual points of light emitted by the LEDs are diffused such that light having less intensity from adjacent LEDs 112 starts to overlap to create areas of light with higher intensity between LEDs 112. If, for example, the thickness of the diffuser film 120 is increased, which may be undesirable for thinner back light units, the individual points of light may be spread even further and provide better uniformity of the light, but there can still be brighter and darker regions.

In one embodiment, the LEDs 112 are blue LEDs formed in an array 110, and backlight units of the present teaching deliver a bright and uniform light to the LCD module 180 in a thin profile of layers between the array 110 and the module 180. These layers can include a pair of crossed brightness enhancement films 150, 160 placed over the diffuser film 120, and a polarizer reflector 170 placed over the pair of crossed brightness enhancement films 150, 160. This layer structure effectively hides the individual LEDs 112 when viewed from the module 180 side of the back light unit architecture 190 and provides a thinner back light unit profile than the back light unit architecture 100 described in connection with FIG. 1A. As described further herein, various layer structures of the present teaching, including different layer types, layer thicknesses and layer positions, can be used to provide one or more display performance objectives. These performance objectives include, for example, producing bright, uniform light, hiding individual and/or supporting light dimming operations with better contrast ratios with the display while maintaining a desired back light unit thickness.

Figure 3:
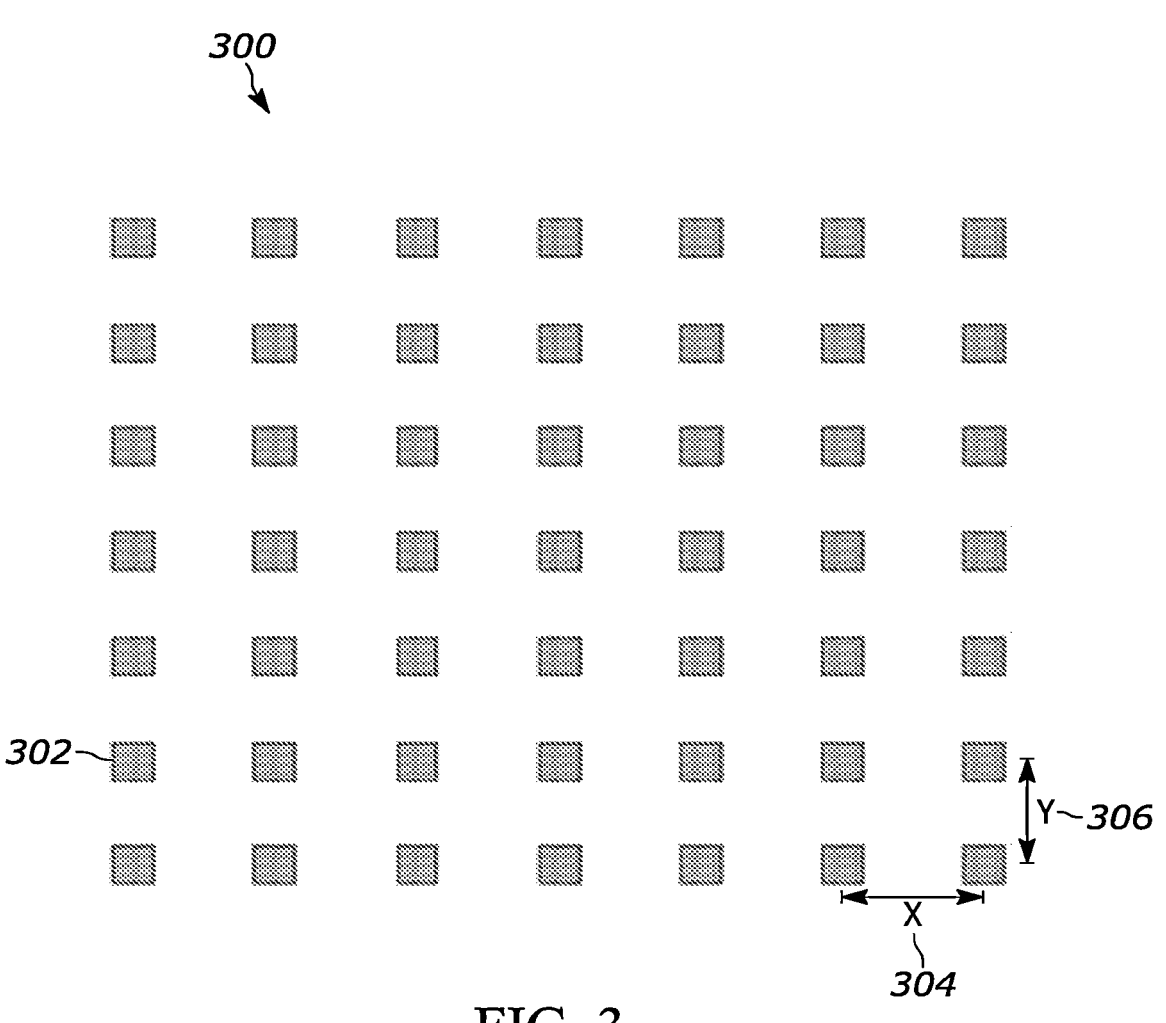
FIG. 3 illustrates a schematic of a two-dimensional array of LEDs that can be used in embodiments of narrow backlight units of the present teaching.

The LEDs 112 can be arranged in an array 110. FIG. 3 illustrates a schematic of a two-dimensional array 300 of LEDs 302 that can be used in embodiments of narrow backlight units of the present teaching. The LED elements 302 of the array 300 are positioned with a nominally uniform spacing, X 304, in one dimension, and a nominally uniform spacing, Y 306, in a second dimension. The LED spacing, X 304 and Y 306, can be the same or they can be different. In some embodiments of LED arrays 300 of the present teaching the LED spacing X 304 is 8 mm and the LED spacing Y 306 is 8 mm. Other LED spacing can also be utilized. The spacing X 304, can also be referred to as a column spacing, and the spacing Y 306 can be referred to as a row spacing. The embodiment of array 300 has seven rows and seven columns. The number of rows and the number of columns can also be varied in various configurations. The number of rows can be the same as the number of columns, as shown in array 300. In some embodiments, one dimension has fewer LED elements than the second dimension. For example, the narrow dimension of a back light unit may be configured with less than 15 LED rows or even less than 10 LED rows. For example, the wider dimension can have a larger number of columns than the number of rows.

Referring to all of FIGS. 1A, 1B and 3, when the LEDs 112, 302 are configured in an array 110, 300, it is desirable to hide the individual LEDs 112, 302 and present a bright and uniform light to the LCD module 180. As noted above, one approach to achieving this goal is to include one or more diffuser films 120, 140 in the back light unit 100, 190 to diffuse, spread, or blur the beams of light emitted by the LEDs 112, 302. In some embodiments, there is a desire to keep the back light unit architecture 100, 190 as thin as possible and a series of MLA films are used.

In some other embodiments, the thickness of the back light unit is not a significant constraint and the back light unit layer thickness can be comparable to, or thicker than, the LED spacing(s) 304, 306. In these embodiments, the issues can be somewhat similar to what is faced in LED-based lighting. Often a single diffuser film can be used above the LEDs with an air gap below it. As examples, the tables 400, 430, 450 described in connection with FIGS. 4A-C, below provide guidelines on the relative size of the air gap to the LED spacing that achieves uniform light distributions for these embodiments with thicker back light unit dimensions. These tables 400, 430, 450 refer to various commercial diffuser layers produced by Brightview Technologies, the assignee of the present application.

One feature of the back light units of the present teaching is the ability to create a highly uniform light output from an array of LEDs that is thin, efficient, and cost effective. Rather than using conventional diffuser films that rely on light scattering, some embodiments of the present teaching use micro-lens array, or MLA, diffuser films to provide improved performance. Instead of scattering, MLAs rely on refraction and total internal reflection to manage optics resulting in numerous advantages including better light uniformity and local dimming performance, a thinner film stack, improved efficiency, and the ability to work with color conversion films to minimize crosstalk.

The diffuser films used in embodiments of the present teaching can include surface microstructures that can be created using many techniques known in the art. For example, in some embodiments, diffuser films of the present teaching can be fabricated with light splitting microstructures having a desired shape being cast onto a substrate using a suitable master mold, and thermally-curing polymer or ultraviolet (UV) light curing polymer. The microstructure shape can also be impressed into a thermoplastic substrate through compression molding or other molding. The shape can also be created at the same time as the substrate using extrusion-embossing or injection molding. The microstructures can be produced by replicating a master. For example, an optical film may be made by replication of a master containing the desired shapes as described in U.S. Pat. No. 7,190,387 B2 to Rinehart et al., entitled "Systems and Methods for Fabricating Optical Microstructures Using a Cylindrical Platform and a Rastered Radiation Beam"; U.S. Pat. No. 7,867,695 B2 to Freese et al., entitled "Methods for Mastering Microstructures Through a Substrate Using Negative Photoresist"; and U.S. Pat. No. 7,192,692 B2 to Wood et al., entitled "Methods for Fabricating Microstructures by Imaging a Radiation Sensitive Layer Sandwiched Between Outer Layers", assigned to the assignee of the present invention, the disclosures of all of these patents are incorporated herein by reference in their entirety. The masters themselves can be fabricated using laser scanning techniques described in these patents and can also be replicated to provide microstructures using replicating techniques described in these patents.

In some embodiments, projection or contact photolithography, such as the technology used in semiconductor, display, circuit board, and other common technologies known in the art, can be used to expose the microstructures into a photosensitive material. In some embodiments, laser ablation, either using a mask or using a focused and modulated laser beam, can be used to create the microstructures including the indicia in a material. In some embodiments, micromachining (in particular diamond micromachining), can be used to create the desired microstructures from a solid material. In some embodiments, additive manufacturing, such as 3D printing can be used to create the desired microstructure in a solid material.

The diffuser films in some embodiments of the present teaching can also be volumetric diffusers where a concentration of particles is embedded in a matrix of a different refractive index.

Diffuser films can be characterized by a so-called full-width at half maximum (FWHM). The FWHM is a measure of the spread of a light distribution exiting the film when illuminated by a collimated beam. The FWHM can be expressed as an angle in units of degrees. A diffuser having a larger FWHM is a stronger diffuser than a diffuser with a smaller FWHM. Some embodiments of the present teaching utilize diffuser films having a FWHM of greater than sixty degrees.

FIG. 4A illustrates a table 400 related to embodiments of diffuser layers including a single-sided coating according to the present teaching. The table 400 indicates the approximate ratio of LED spacing to the air gap between the top of the LED array and the bottom surface of the diffuser layer that is needed to achieve uniform spatial intensity and angular distributions. Diffusers toward the top of this table 400 have relatively weak hiding or LED smoothing and require larger air gaps to achieve smooth uniform luminance. Diffusers toward the bottom of this table 400 are used when strong, smooth hiding of LED sources is desired with smaller air gaps.

FIG. 4B illustrates a table 430 related to embodiments of diffuser layers including a double-sided coating according to the present teaching. The table 430 indicates the approximate ratio of LED spacing to the air gap to achieve uniform spatial intensity and angular distributions. Some embodiments of diffuser layers include a double-sided coating that gives them stronger LED hiding and can provide greater efficiency than embodiments of diffuser layers described in connection with FIG. 4A. Diffuser layers toward the top of this table 430 have relatively weak hiding or LED smoothing and require larger air gaps to achieve smooth uniform luminance. Diffuser layers toward the bottom of this table 430 are used when strong, smooth hiding of LED sources is desired with smaller air gap. Increased strength of diffusion produces more LED hiding with smaller air gaps.

Figure 4C:
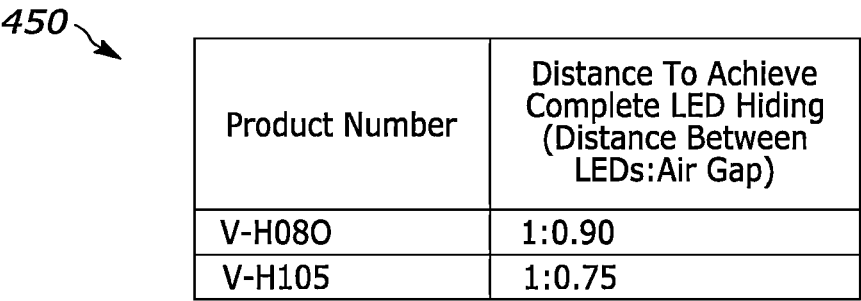
FIG. 4C illustrates a table related to embodiments of diffuser layers including volumetric diffuser layers that have strong hiding or LED smoothing properties.

FIG. 4C illustrates a table 450 related to embodiments of diffuser layers including volumetric diffusers that have strong hiding or LED smoothing properties. The table 450 indicates the approximate ratio of LED spacing to the air gap to achieve uniform spatial intensity and angular distributions. The volumetric diffuser films shown in the table 450 provide smooth uniform luminance with small air gaps.

Figure 5:
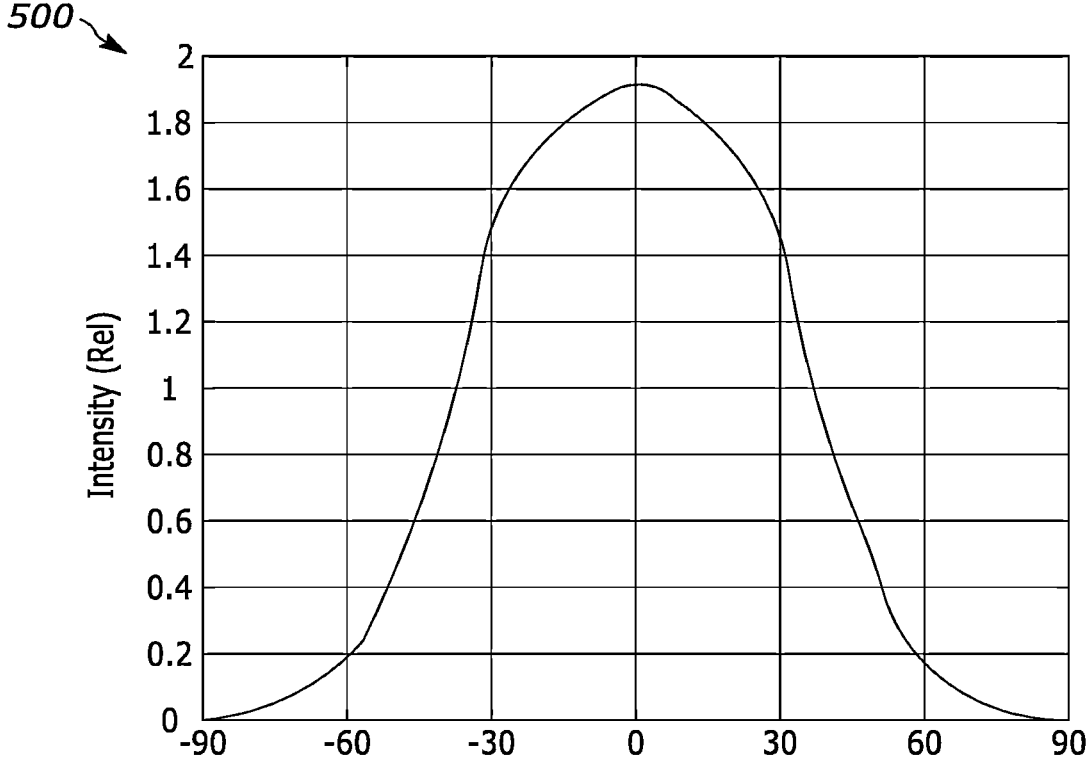
FIG. 5 illustrates a graph of a measured angular intensity distribution of an embodiment of a high-hiding microstructure double-sided diffuser layer of the present teaching.

FIG. 5 illustrates a graph 500 of a measured angular intensity distribution of an embodiment of a high-hiding microstructure double-sided diffuser layer of the present teaching. By strong or high hiding, we mean generating a uniform output from multiple LEDs that does not make individual LED elements visible at the output. Lower hiding will still smooth and make more uniform the light at the output, but there is more variation of the light at the center of the LED as compared to the region adjacent to the LED center when viewed at the top surface or output of the back light unit. The double-sided diffuser layer that is subject to the measurement is the diffuser associated with the last entry in the table 430 described in connection with the description of FIG. 4B. That is diffuser product number C-HH90, that has a distance to achieve complete LED hiding as a ratio of LED spacing to air gap of 1:0.85.

In some embodiments of back light units of the present teaching, the LEDs typically have an emitting area of a few hundred microns to more than a millimeter. The large emitting area is necessary to achieve high brightness from a relatively small number of LEDs. Similar to known lighting applications, it is desirable for back light units of the present teaching to achieve uniformity in intensity and angular distribution while maximizing brightness. In the case embodiments that use mini-led arrays, it is desirable to also minimize the point spread function of light from a single LED to facilitate local dimming.

Various descriptions of embodiments herein refer to the use of double-sided diffuser layers. However, different diffuser layers can be used, including, for example, single-sided diffuser layers, volumetric diffuser layers and circular diffuser layers.

Figure 6A:
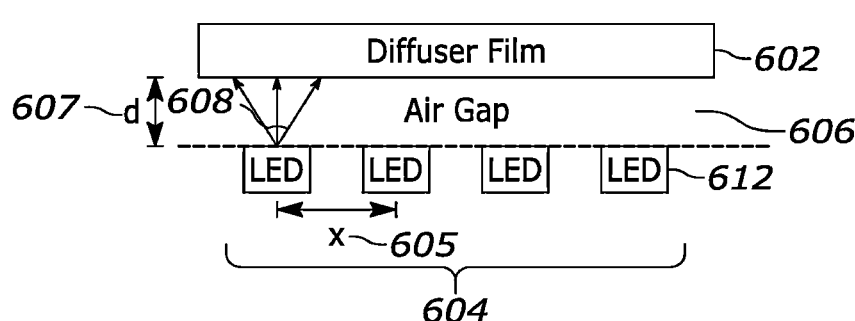
FIG. 6A illustrates a schematic of a layer structure for an embodiment of a back light unit having a double-sided diffuser layer and air gap of the present teaching.

FIG. 6A illustrates a schematic of a layer structure 600 for an embodiment of a back light unit having a double-sided diffuser layer and air gap of the present teaching. A diffuser film 602 is positioned over an LED array 604 comprising individual LEDs 612 spaced with a spacing, x 605. An air gap 606 is formed between the top of the LED array 604 and the bottom of the film 602. The air gap has a thickness, d 607. Light emerges from the top of the LEDs 612 with an angular distribution characterized by angle 608. The distribution from an LED 612 can be a Lambertian distribution into air having angular distribution with spread angle 608 equal to 180 degrees (±90 degrees). It can be seen, for a fixed angle 608 characterizing light emanating from the LED, that the larger the thickness of the air gap, the larger the size of the light distribution at the bottom surface of the diffuser film 602, and so less hiding or LED smoothing is needed from the film 602 to produce smooth uniform luminance from the top surface of the layer structure 600.

Figure 6B:
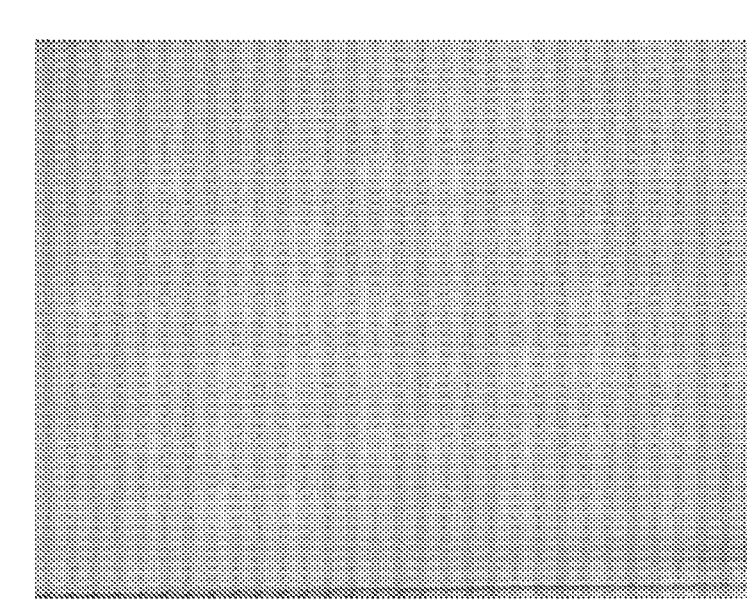
FIG. 6B illustrates a visual image of an embodiment of a back light unit of FIG. 6A having a double-sided diffuser layer and a small air gap thickness.
Figure 6C:
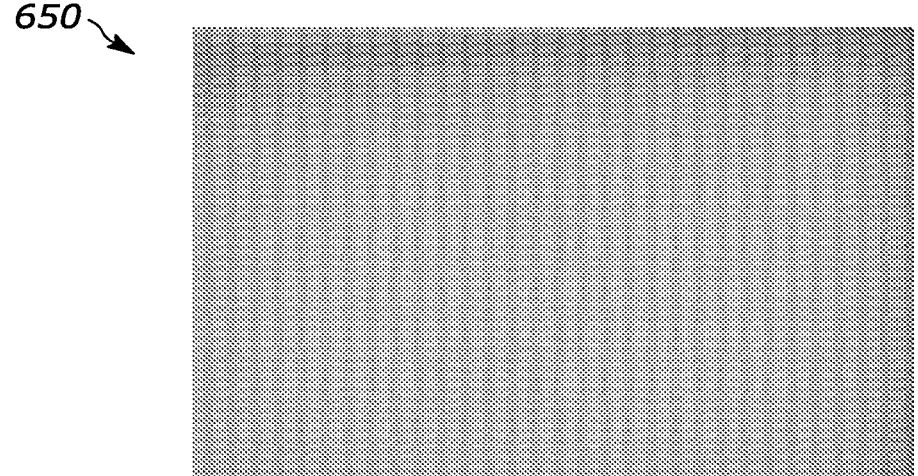
FIG. 6C illustrates a visual image of an embodiment of a back light unit of FIG. 6A having a double-sided diffuser layer and a larger air gap thickness.

FIG. 6B illustrates a visual image 630 of an embodiment of a back light unit of FIG. 6A having a double-sided diffuser layer and a small air gap thickness. Specifically, FIG. 6B is a visual image 630 of an ~8×8 array of LEDs spaced 8 mm apart with a 200-micron thick HH90 diffuser placed 8 mm above the LEDs with an air gap between the LEDs and the HH90 diffuser. As such, x=8 mm and d=8 mm. Reference herein to HH90 refers to a diffuser having product number C-HH90 as illustrated in table 430 of FIG. 4B FIG. 6C illustrates a visual image 650 of an embodiment of a back light unit of FIG. 6A having a double-sided diffuser layer and a larger air gap thickness. Specifically, FIG. 6C is a visual image 650 of an ~8×10 array of LEDs spaced 8 mm apart with a 200-micron thick HH90 diffuser placed 12 mm above the LEDs (d=12 mm) with an air gap between the LEDs and the HH90 diffuser. The additional smoothing of the illumination caused by the larger thickness, d 607, of the air gap 606 while using the same diffuser film 602 is evident. Referring to both FIGS. 6B and 6C, it can be seen from visual image 630 of FIG. 6B that at an 8 mm air gap there is some significant spatial non-uniformities in intensity but with a 12 mm air gap, as shown in the visual image 650 of FIG. 6C, the intensity is very uniform. Thus, embodiments of back light units of the present teaching can provide a desired uniformity and/or hiding of individual LEDs by using a particular ratio of array spacing and air gap thickness between the array and a diffuser layer.

Figure 7A:
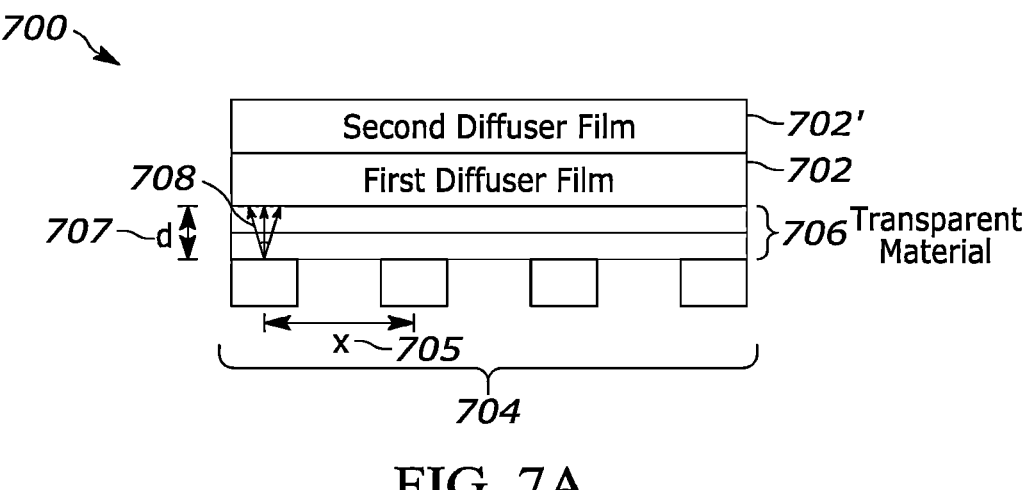
FIG. 7A illustrates a schematic of a layer structure for an embodiment of a back light unit according to the present teaching having a double-sided diffuser layer, second diffuser layer, and a transparent material layer.

FIG. 7A illustrates a schematic of a layer structure for an embodiment of a back light unit according to the present teaching having a double-sided diffuser layer, second diffuser layer, and a transparent material layer. A first diffuser film 702 is positioned over an LED array 704 comprising individual LEDs spaced with a spacing, x 705. In one embodiment, the first diffuser film 702 comprises a top surface diffuser layer, a bottom surface diffuser layer, and a thin transparent material layer in between the top surface diffuser layer and the bottom surface diffuser layer. Such films are sometimes referred to as double-sided diffuser layers. In some configurations, a second diffuser film 702' is positioned over the first diffuser film 702.

A layer 706 of transparent material having a thickness, d 707, is positioned between the LED array 704 and the diffuser film 702. In various embodiments, the transparent material layer 706 comprises one or more films that occupy the region from the top of the LED array 704 to the bottom of the diffuser film 702. The transparent material layer 706 generally has a refractive index that is higher than air. In some embodiments, the transparent material layer 706 is one or more films of polymethyl methacrylate (PMMA). Light emerges from the top of the LEDs in the array 704 in a Lambertian distribution that is transformed to a narrower angular distribution characterized by angle 708 in the transparent material layer 706. The angle 708, which characterizes the angular distribution of light in the transparent material layer 706 is smaller than the angle 608 for the light in the air gap 606 described in connection with FIG. 6A because the refractive index is larger than one. The transformation is described by Snell's law as described further below. For example, the Lambertian distribution from an LED emitting into a material with refractive index of 1.5 produces an angular distribution with angle 708 equal to 79.2 degrees (±39.6 degrees). In general, the transparent material layer 706 transforms the angle of the light distribution from a bare LED emitting into air into an angle that is less than ±90 degrees around center.

Figure 7B:
FIG. 7B illustrates a visual image of an embodiment of a back light unit of FIG. 7A having a double-sided diffuser layer and a small transparent material layer thickness.
Figure 7B:
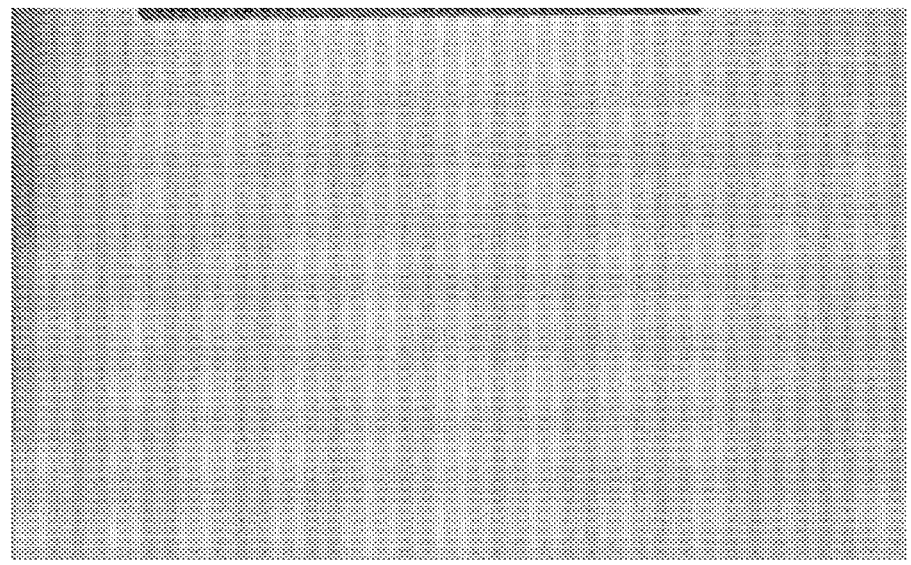

FIG. 7B illustrates a visual image 710 of an embodiment of a back light unit of FIG. 7A having a double-sided diffuser layer and a small transparent material layer thickness. Specifically, FIG. 7B is a visual image 710 of an ~8×10 array of LEDs spaced 8 mm apart with a 200-micron-thick HH90 diffuser placed 8 mm above the LEDs with two layers of 4 mm thick PMMA between the LEDs and the HH90 diffuser.

Figure 7C:
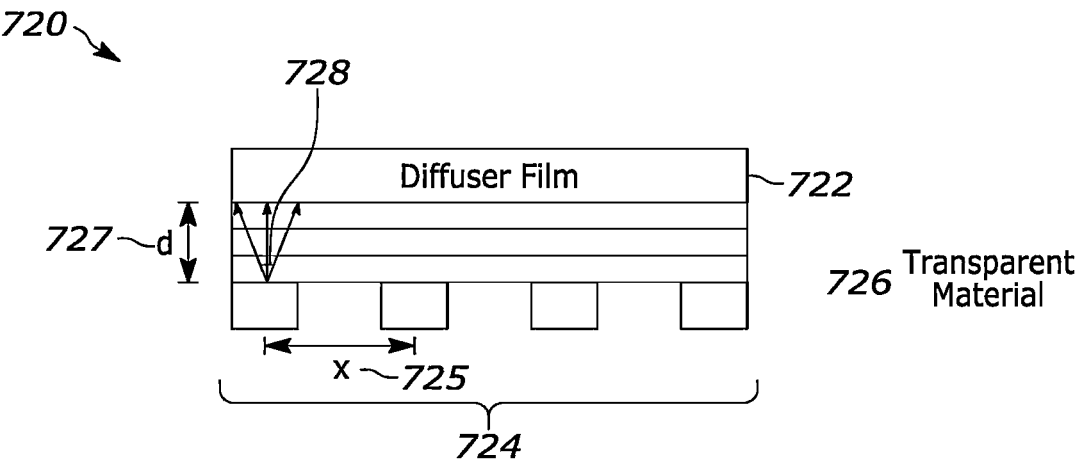
FIG. 7C illustrates a schematic of a layer structure for an embodiment of a back light unit having a double-sided diffuser layer and a larger transparent material layer thickness of the present teaching.

FIG. 7C illustrates a schematic of a layer structure 720 for an embodiment of a back light unit having a double-sided diffuser layer and a larger transparent material layer thickness of the present teaching. A diffuser film 722 is positioned over an LED array 724 comprising individual LEDs spaced with a spacing, x 725. A transparent material layer 726 having a thickness, d 727, is positioned between the LED array 724 and the diffuser film 722, Light emerges from the top of the LEDs in the array 724 with an angular distribution characterized by angle 728.

Figure 7D:
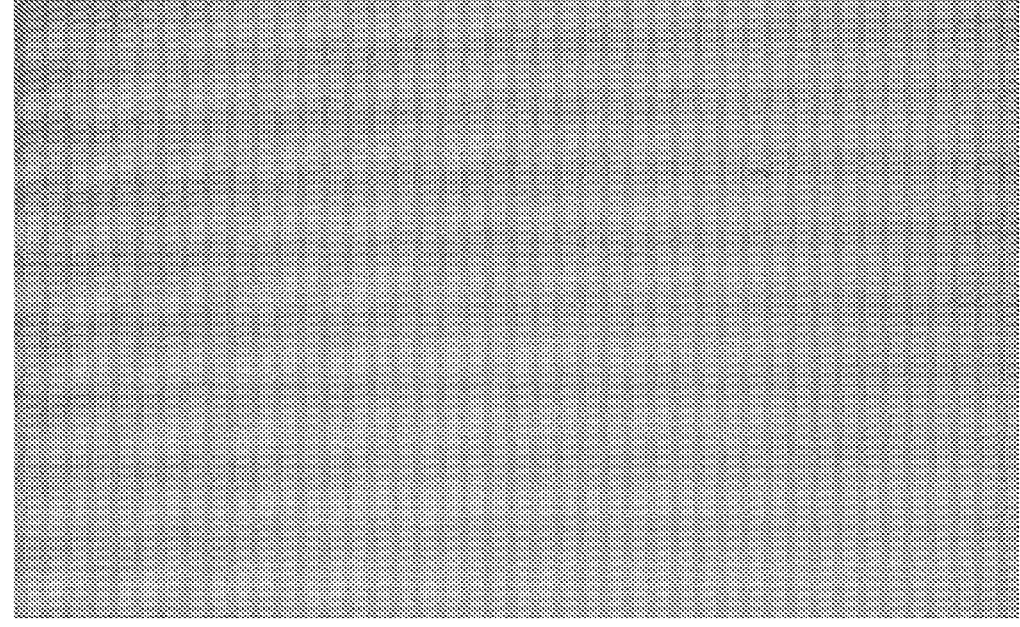
FIG. 7D illustrates a visual image of an embodiment of a back light unit of FIG. 7C.

FIG. 7D illustrates a visual image 730 of an embodiment of a back light unit of FIG. 7C. Specifically, the visual image 730 is from an ~8×10 array of LEDs spaced 8 mm apart with a 200-micron-thick HH90 diffuser placed 12 mm above the LEDs with three layers of 4 mm thick PMMA between the LEDs and the HH90 diffuser. More smoothing of the illumination from individual LEDs in the array caused by the thicker transparent material layer is evident from this visual image 730 as compared, for example, to the visual image 710 described in connection with FIG. 7B.

Figure 7E:
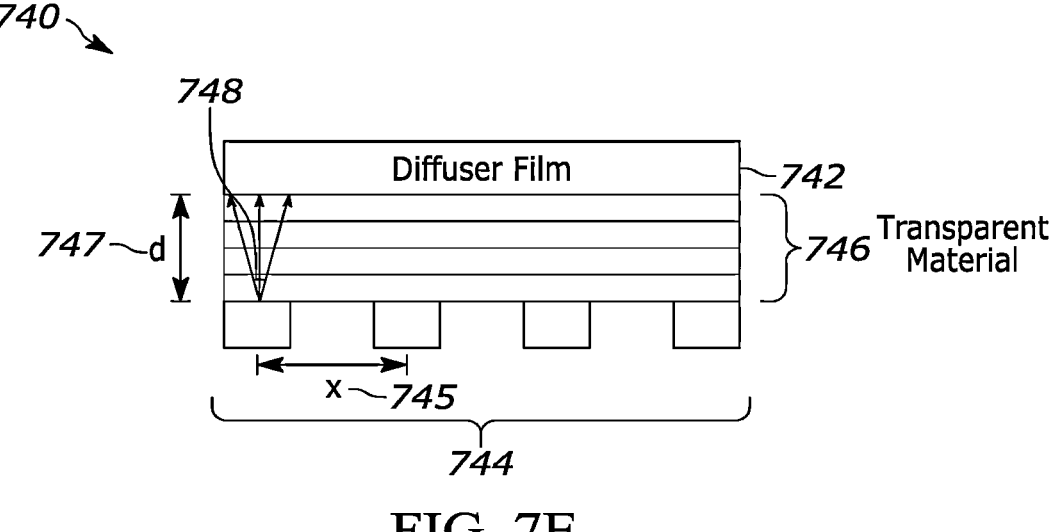
FIG. 7E illustrates a schematic of a layer structure for an embodiment of a back light unit having a double-sided diffuser layer and an even larger transparent material layer thickness of the present teaching.

FIG. 7E illustrates a schematic of a layer structure 740 for an embodiment of a back light unit having a double-sided diffuser layer and an even larger transparent material layer thickness of the present teaching. Like the layer structures 700, 720 described in connection with FIGS. 7A and 7C, this layer structure 740 also has a diffuser layer 742, LED array 744 having spacing x 745, a transparent material layer 746 and an angular distribution angle 748. The thickness, d 747, is larger in the layer structure 740 as compared to layer structures 700, 720. The thicker transparent material layer 746 leads to better hiding of individual LEDs in the array 744 for the same diffuser film 742 characteristics.

Figure 7F:
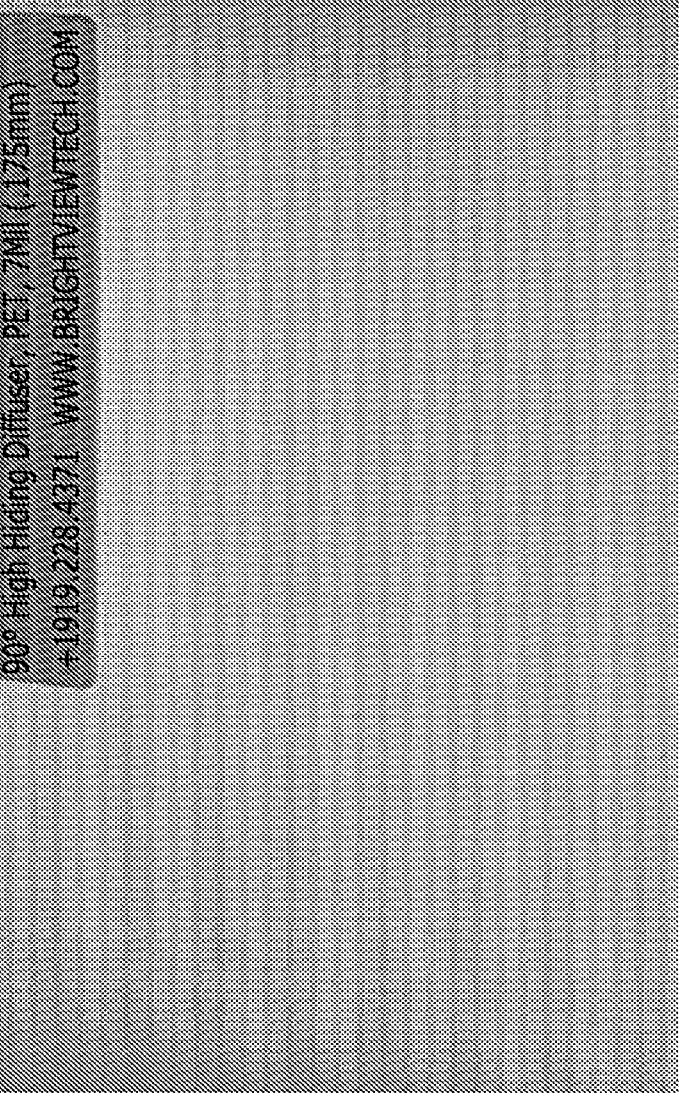
FIG. 7F illustrates a visual image of an embodiment of a back light unit of FIG. 7E.

FIG. 7F illustrates a visual image 750 of an embodiment of a back light unit of FIG. 7E. Specifically, the visual image 750 is from an ~8×10 array of LEDs spaced 8 mm apart with a 200-micron-thick HH90 diffuser placed 16 mm above the LEDs with four layers of 4 mm thick PMMA between the LEDs and the HH90 diffuser. The better hiding of the thicker transparent material layer is evident.

Figure 7G:
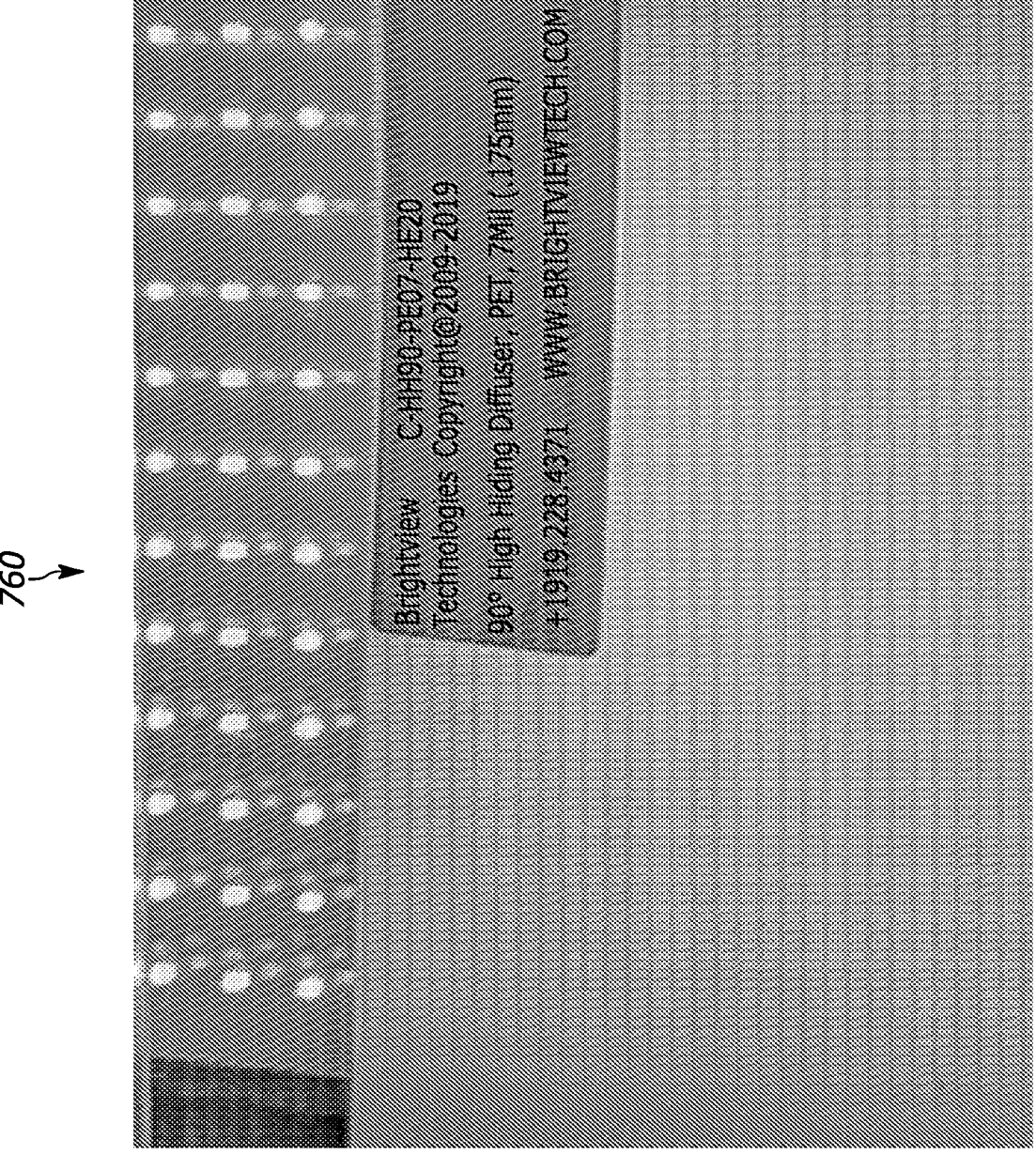
FIG. 7G illustrates a visual image of an embodiment of a back light unit having a double-sided diffuser layer over a 20-mm-thick transparent material layer.

FIG. 7G illustrates a visual image 760 of an embodiment of a back light unit having a double-sided diffuser layer over a 20-mm-thick transparent material layer. Specifically, the visual image 760 is from an ~8×10 array of LEDs spaced 8 mm apart with a 200-micron-thick HH90 diffuser placed 20 mm above the LEDs with 5 layers of 4 mm thick PMMA between the LEDs and the HH90 diffuser. This visual image 760 also shows the illumination from some LEDs directly from the LED array with no films. The better hiding as transparent material layer thickness is increased is evident.

Figure 7H:
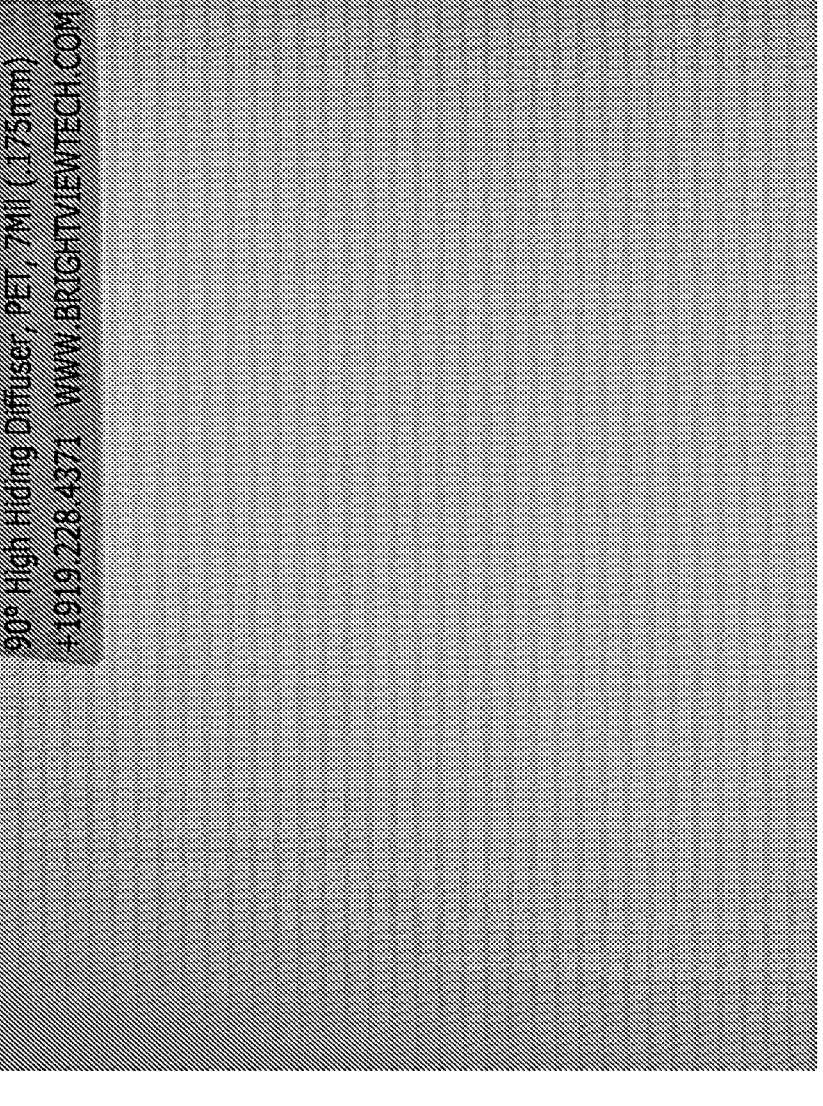
FIG. 7H illustrates a visual image of an embodiment of a back light unit having a double-sided diffuser layer over a 24-mm-thick transparent material layer.

FIG. 7H illustrates a visual image 770 of an embodiment of a back light unit having a double-sided diffuser layer over a 24-mm-thick transparent material layer. Specifically, the visual image 770 is from an ~8×10 array of LEDs spaced 8 mm apart with a 200-micron-thick HH90 diffuser placed 24 mm above the LEDs with 6 layers of 4 mm thick PMMA between the LEDs and the HH90 diffuser. The better hiding as transparent material layer thickness is increased is evident.

Figure 7I:
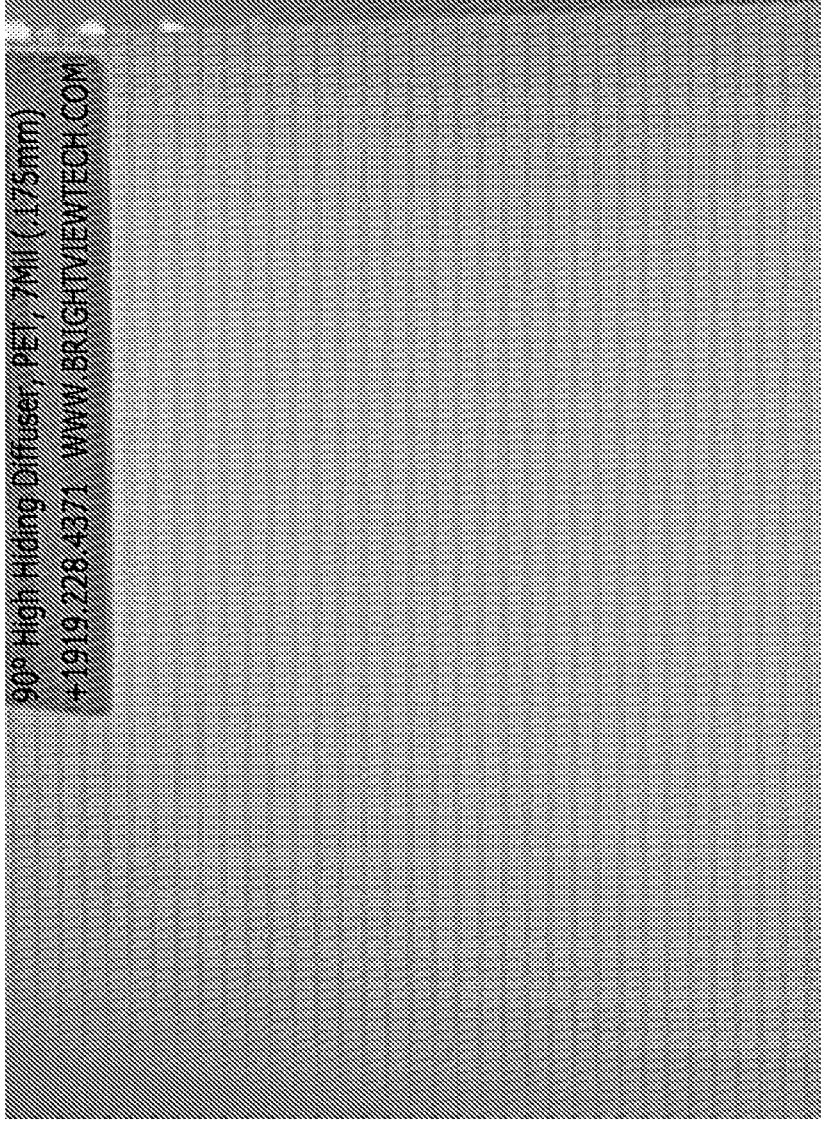
FIG. 7I illustrates a visual image of an embodiment of a back light unit having a double-sided diffuser layer over a 28-mm-thick transparent material layer.

FIG. 7I illustrates a visual image 780 of an embodiment of a back light unit having a double-sided diffuser layer over a 28-mm-thick transparent material layer. Specifically, the visual image 780 of an ~8×10 array of LEDs spaced 8 mm apart with a 200-micron-thick HH90 diffuser placed 28 mm above the LEDs with 7 layers of 4 mm thick PMMA between the LEDs and the HH90 diffuser. The better hiding as transparent material layer thickness is increased is evident. The examples presented in FIGS. 7A-I illustrate how embodiments of back light units of the present teaching can provide a desired uniformity and/or hiding of individual LEDs by using a particular ratio of array spacing, transparent material layer thickness between the array and a diffuser layer. The transparent layer refractive index can also be chosen as a parameter to provide a desired uniformity.

Comparing the back light unit embodiments described in connection with FIGS. 6A-C to those described in connection with FIGS. 7A-I, it is clear that if the air gap is replaced by PMMA with a refractive index of 1.5 the visual uniformity is much worse if the air gap thickness and transparent material layer thickness are the same or similar. For example, comparing visual image 650 of FIG. 6C, which has 12 mm of air between the diffuser and the LEDs with visual image 730 of FIG. 7D, which has 12 mm of PMMA between the diffuser and the LEDs it can be seen that while 12 mm of air results in excellent uniformity, 12 mm of PMMA has very poor uniformity. In fact, with a transparent material layer that comprises PMMA, it is seen that 24 to 28 mm of thickness is required to achieve excellent uniformity as evident in visual image 770 shown in FIG. 7H and visual image 780 shown in FIG. 7I.

This larger thickness requirement with a higher index material in the space between the LED array and the bottom of the diffuser layer is to be expected because in air the Lambertian distribution has light rays from −90 to plus 90 degrees which allows the light to spread rapidly in the lateral directions. By contrast once the Lambertian distribution from the LEDs enters, for example, a transparent material layer made from PMMA it is confined to between ±41.8 degrees because of Snell's equation, $n_1*\sin(\Theta_1)=n_2*\sin(\Theta_2)$, where $n_1=1$, for air, and $n_2=1.5$, for PMMA. For polycarbonate material with a higher refractive index of 1.57 the light would be confined between ±39.6 degrees. If the refractive index of the material between the LEDs and the diffuser is 1.75, then the light is confined between ±34.8 degrees. For example, some polymer materials can have high refractive index. The large thicknesses when using PMMA, or other high-index transparent material, between the LEDs and the diffuser can be disadvantageous due to the significant increase in thickness, weight and material. As such, some embodiments of the back light units of the present teaching use additional layers in the layer structure architecture of the back light unit as described further below.

For example, some embodiments of the present teaching use back light unit architectures that include a pair of brightness enhancing films (e.g. using ~90-degree apex angle prisms) that are oriented approximately perpendicular to each other and also a DBEF film which is a reflecting polarizer. The crossed brightness enhancement films narrow the optical distribution, enhancing the on-axis brightness. The DBEF film also enhances the brightness out of a LCD module by transmitting only one polarization and recycling the other.

Figure 8A:
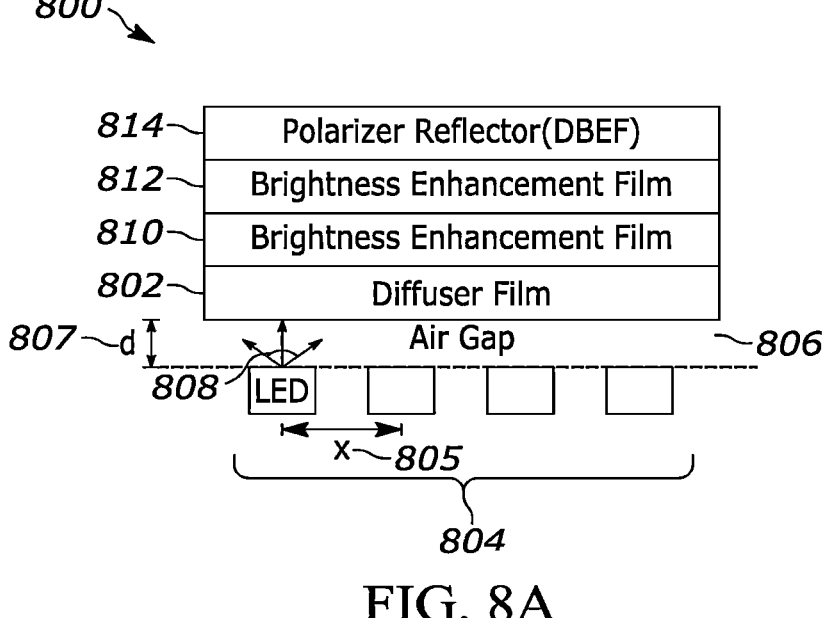
FIG. 8A illustrates a schematic of a layer structure for an embodiment of a back light unit having a double-sided diffuser layer over an air gap and an additional pair of high-index cross brightness enhancement films and a polarizer reflector film above the double-sided diffuser layer.

FIG. 8A illustrates a schematic of a layer structure 800 for an embodiment of a back light unit having a double-sided diffuser layer 802 over an air gap 806 and an additional pair of high-index cross brightness enhancement films 810, 812 and a polarizer reflector film 814 above the double-sided diffuser layer 802. A diffuser film 802 is positioned over an LED array 804 comprising individual LEDs spaced with a spacing, x 805. An air gap 806 is formed between the top of the LED array 804 and the bottom of the film 802. The air gap has a thickness, d 807. Light emerges from the top of the LEDs in the array 804 with an angular distribution characterized by angle 808. A pair of brightness enhancement films 810, 812 are positioned over the diffuser film 802 and a polarizer reflector (DBEF) film 814 is positioned over the brightness enhancement film pair 810, 812.

Figure 8B:
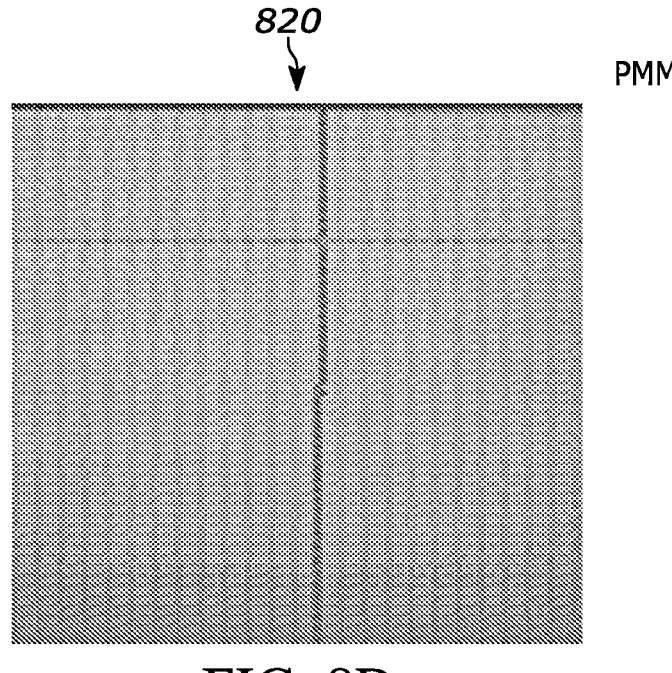
FIG. 8B illustrates a visual image of an embodiment of the back light unit of FIG. 8A with an air gap thickness of 6 mm.

FIG. 8B illustrates a visual image 820 of an embodiment of the back light unit of FIG. 8A with an air gap thickness of 6 mm. Specifically, the visual image 820 is from an ~8×10 array of LEDs spaced 8 mm apart with a 200-micron-thick HH90 diffuser placed 6 mm above the LEDs with air between the LEDs and the HH90 diffuser. In this embodiment, there is an additional pair of high-index cross brightness enhancement films and a DBEF film above the HH90 diffuser, each film being about 200 microns in thickness.

Figure 8C:
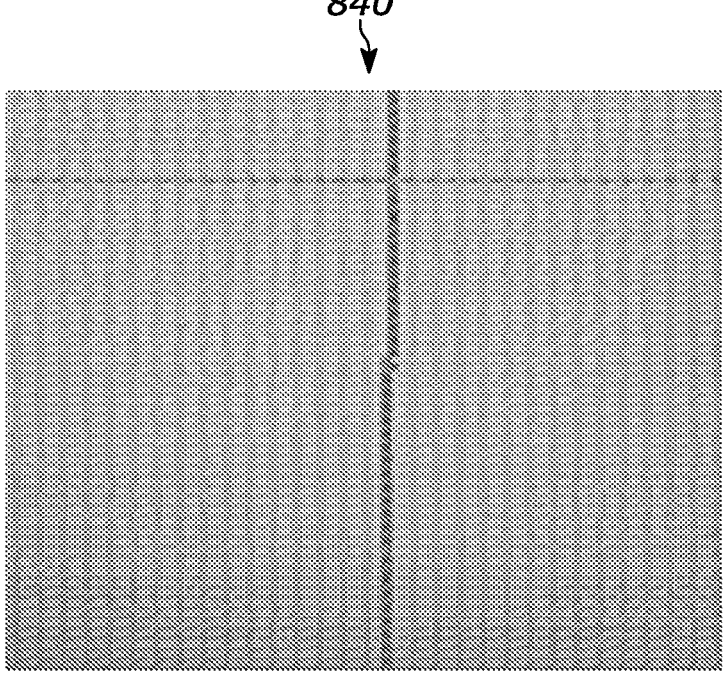
FIG. 8C illustrates a visual image of an embodiment of the back light unit of FIG. 8A with an air gap thickness of 7 mm.

FIG. 8C illustrates a visual image 840 of an embodiment of the back light unit of FIG. 8A with an air gap thickness of 7 mm. Specifically, the visual image 840 is from an ~8×10 array of LEDs spaced 8 mm apart with a 200-micron-thick HH90 diffuser placed 7 mm above the LEDs with air between the LEDs and the HH90 diffuser. In this embodiment, there is an additional pair of high-index cross brightness enhancement films and a DBEF film above the HH90 diffuser, with each film being about 200 microns in thickness.

Comparing FIGS. 6A-C and FIGS. 8A-C illustrates the benefits of including two brightness enhancement films 810, 812 and a polarizer reflector 814 over the diffuser film 802 and air gap 806. Uniform illumination is provided with a relatively smaller air gap if additional films are used. The visual image 840 of FIG. 8C shows that very good uniformity is achieved with and air gap of approximately 7 mm. This compares with a value closer to 10 or 12 mm without the three additional films above the HH90 diffuser. For example, the visual image 650 of FIG. 6C shows a highly uniform distribution with a 12 mm air gap for an architecture layer structure 600 shown in FIG. 6A having no additional films above the diffuser film 602.

Figure 9A:
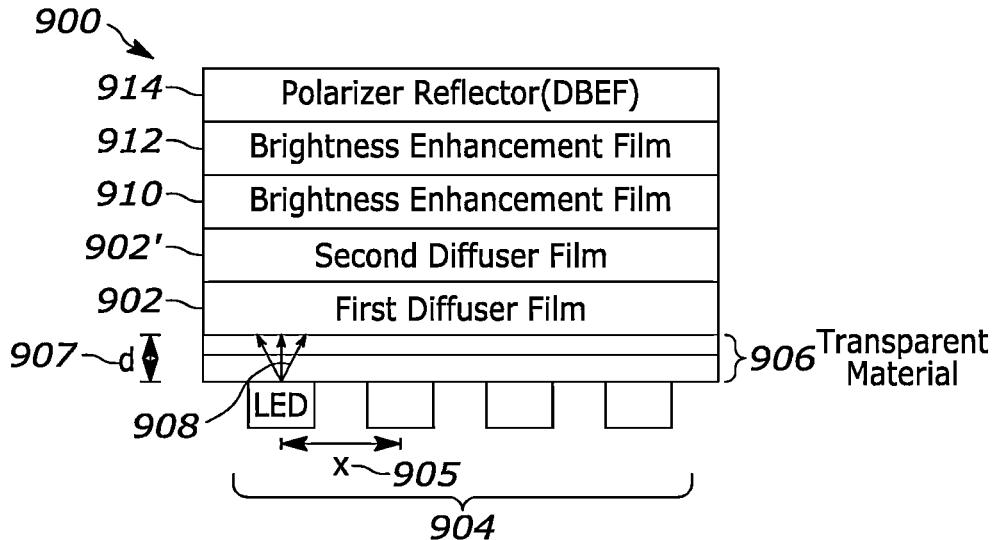
FIG. 9A illustrates a schematic of a layer structure for an embodiment of a back light unit according to the present teaching having a double-sided diffuser layer, a second diffuser layer, a transparent material layer, a pair of high-index cross brightness enhancement films, and a polarizer reflector film.

FIG. 9A illustrates a schematic of a layer structure 900 for an embodiment of a back light unit according to the present teaching having a double-sided diffuser layer 902, a second diffuser layer 902', a transparent material layer 906, pair of high-index cross brightness enhancement films 910, 912, and a polarizer reflector film 914. The first diffuser film 902 is positioned over one or more transparent material layers 906. The first diffuser film 902 can be a double sided diffuser layer that comprises a top surface diffuser layer, a bottom surface diffuser layer, and a thin transparent material layer in between the top surface diffuser layer and the bottom surface diffuser layer (structure detail not shown). In other embodiments, the first diffuser film 902 is a single surface diffuser layer.

In some configurations, a second diffuser film 902' is positioned over the first diffuser film 902. An LED array 904 having element spacing of x 905 is positioned underneath the transparent material layer 906. The transparent material layer 906 has thickness d 907. The individual LEDs have an angular distribution of light characterized by angle 908 in the transparent material layer 906. A pair of high-index cross brightness enhancement films 910, 912 are positioned over the second diffuser film 902'. A polarizer reflector film 914 is positioned above the double-sided diffuser layer.

Figure 9B:
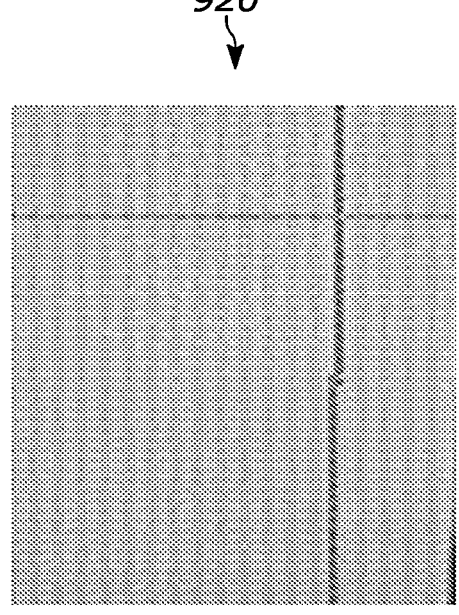
FIG. 9B illustrates a visual image of an embodiment of the back light unit of FIG. 9A.
Figure 9C:
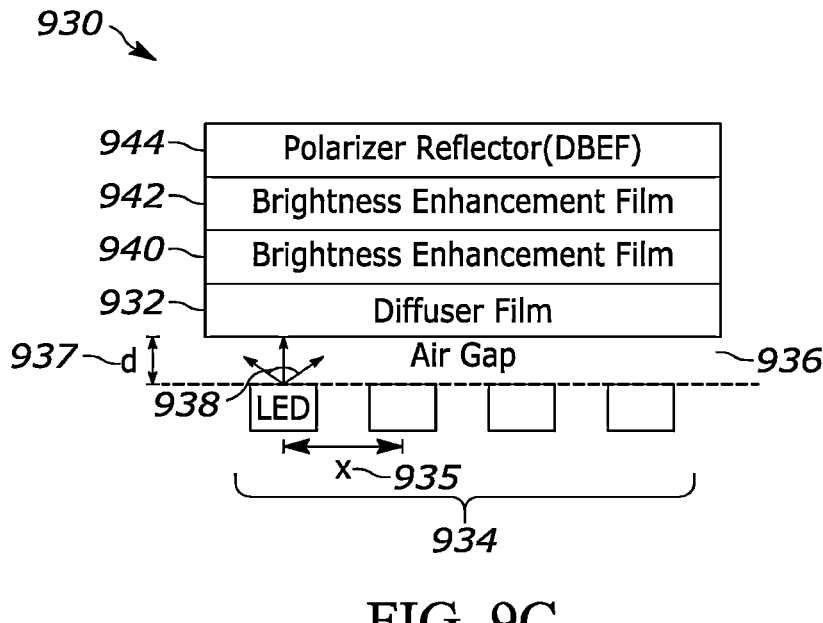
FIG. 9C illustrates a schematic of a layer structure for an embodiment of a back light unit having a double-sided diffuser layer over an air gap with an additional pair of high-index cross brightness enhancement films and a polarizer reflector film above the double-sided diffuser layer.

FIG. 9B illustrates a visual image 920 of an embodiment of the back light unit of FIG. 9A. Specifically, the visual image 920 is from an ~8×10 array of LEDs spaced 8 mm apart with a 200-micron-thick HH90 diffuser placed 7 mm above the LEDs with a 4 mm and a 3 mm PMMA layer between the LEDs and the HH90 diffuser. In this embodiment, there is an additional pair of high-index cross BEF films 910, 912 and a DBEF film 914 above the HH90 diffuser 902, each film being about 200 microns in thickness FIG. 9C illustrates a schematic of a layer structure 930 for an embodiment of a back light unit having a double-sided diffuser layer 932 over an air gap 936 with an additional pair of high-index cross brightness enhancement films 940, 942 and a polarizer reflector film 944 above the double-sided diffuser layer 932. An LED array 934 having element spacing of x 935 is positioned underneath the air gap 936. The air gap 935 has thickness d 937. The individual LEDs have angular distribution of light characterized by angle 938.

Figure 9D:
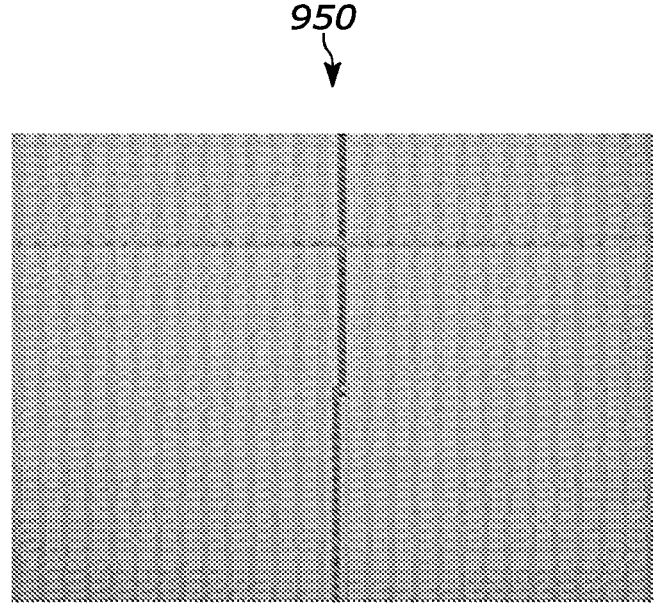
FIG. 9D illustrates a visual image of an embodiment of the back light unit of FIG. 9C.

FIG. 9D illustrates a visual image 950 of an embodiment of the back light unit of FIG. 9C. Specifically, the visual image 950 is from an ~8×10 array of LEDs spaced 8 mm apart with a 200-micron-thick HH90 diffuser placed 7 mm above the LEDs with air between the LEDs and the HH90 diffuser. In this embodiment, there is an additional pair of high-index cross BEF films 940, 942 and a DBEF 944 film above the HH90 diffuser, each film being about 200 microns in thickness.

Surprisingly, it can be seen the uniformity shown in the visual image 920 of FIG. 9B, which has a layer of 4 mm PMMA and a layer of 3 mm PMMA under the HH90 diffuser, is comparable or better than the visual image 950 of FIG. 9D, which has a 7 mm air gap under the HH90 diffuser. This compares with needing 24-28 mm of PMMA without the three extra films and seeing similar uniformity with air gap of the same thickness as discussed in connection with FIGS. 7H and 7I.

In some embodiments, a thickness of the solid transparent material layer is greater than or equal to half of a thickness measured from the top of the two-dimensional array of LEDs to the top of the back light unit. So, for example, and referring to an embodiment that includes three films over the transparent material layer such as an embodiment of FIG.

9A, a thickness, d 907, of the transparent material layer 906 is half a thickness measured from the top of the array 904 to the top of the polarizer reflector 914. This thickness is the total of the thickness, d 907, plus the thickness of the diffuser film 902, plus the thickness of the brightness enhancement film 910, plus the thickness of the brightness enhancement film 912, and plus the thickness of the polarizer reflector film 914. In various embodiments, this thickness generally is the thickness of the transparent material layer plus the thickness of any additional layers on top of the transparent material layer. In some embodiments, a thickness of the solid transparent material layer is greater than or equal to 0.7 times a thickness measured from the top of the two-dimensional array of LEDs to the top of the back light unit. In various embodiments, this thickness is the thickness of the transparent material layer plus the thickness of any additional layers on top of the transparent material layer.

Figure 10:
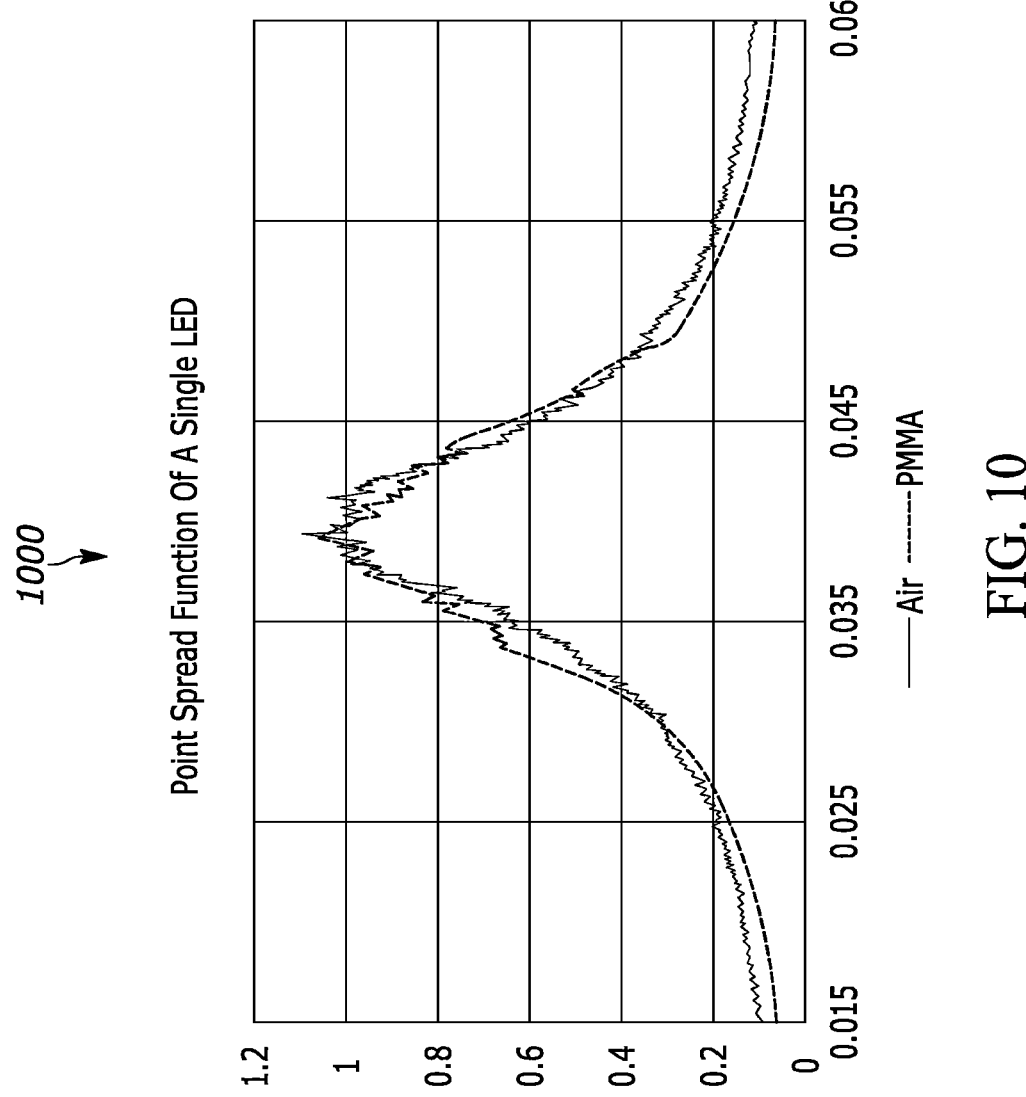
FIG. 10 illustrates a graph of a point spread function of a single LED for embodiments of a back light unit of the present teaching.

FIG. 10 illustrates a graph 1000 of a point spread function of a single LED for embodiments of a back light unit layer structure of the present teaching. The point spread function can be thought of as characterizing the degree of spreading of an image of a point source produced by an optical system. The luminance distribution is shown in the graph 1000 as a function of position (m) for when a single LED is on for the case of either 7.5 mm or PMMA (dashed line) or air (solid line) between the LEDs and the film stack consisting of an HH90 diffuser, a pair of cross BEF films, and a DBEF film. The profiles have each been normalized by the peak intensity. The case of 7.5 mm of PMMA has a peak intensity that is 67% higher than the case of the air gap. Also, correspondingly the case of the PMMA has relatively less luminance in the tails. This results in a better point spread function for the case of solid material (PMMA in this case) in the transparent material layer between the LEDs and the film stack than the air gap. The better point spread function facilitates local dimming. The higher peak intensity and less energy in the wings is due to the narrower confinement of the light within the PMMA compared to the Lambertian distribution in the air. This in turn results in overall higher average luminance in many cases. For example, in the case of 8 mm LED spacing where the total dimension is ~90 mm in the narrow direction the average Luminance is ~10% higher which is very desirable.

Figure 11A:
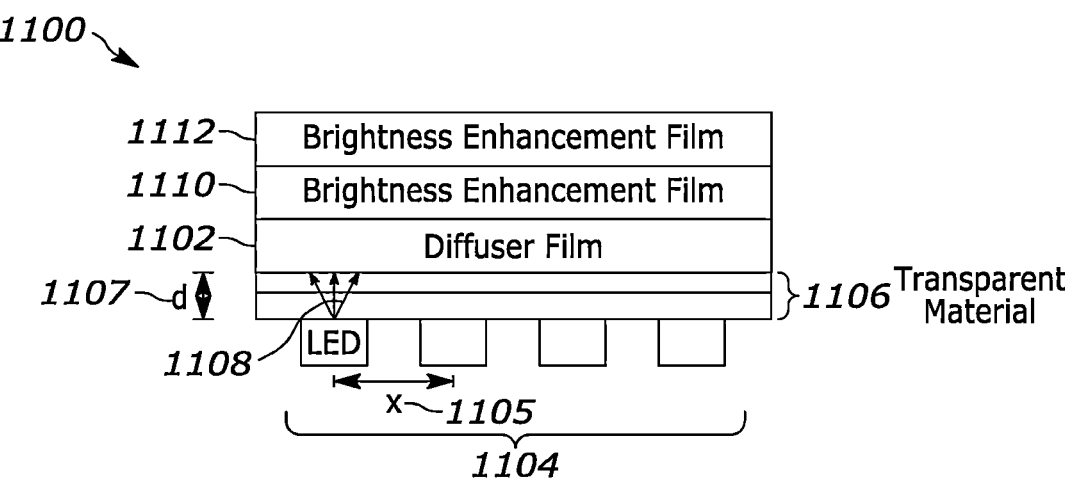
FIG. 11A illustrates a schematic of a layer structure for an embodiment of a back light unit having a double-sided diffuser layer over a transparent material layer with an additional pair of high-index cross brightness enhancement films above the double-sided diffuser layer.

FIG. 11A illustrates a schematic of a layer structure 1100 for an embodiment of a back light unit having a double-sided diffuser layer 1102 over a transparent material layer 1106 with an additional pair of high-index cross brightness enhancement films 1110, 1112 above the double-sided diffuser layer 1102. An LED array 1104 having element spacing of x 1105 is positioned underneath the transparent material layer 1106. The transparent material layer 1106 has thickness d 1107. The individual LEDs have angular distribution of light characterized by angle 1108.

Figure 11B:
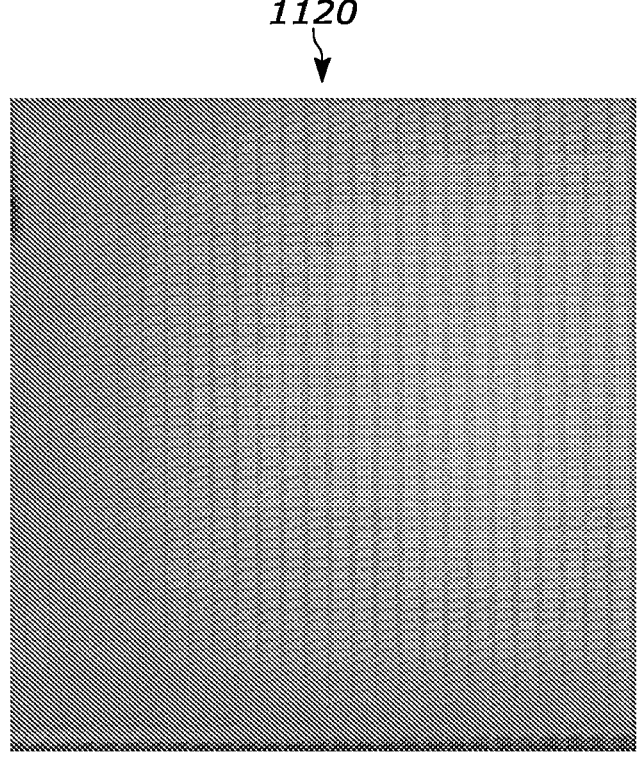
FIG. 11B illustrates a visual image of an embodiment of the back light unit of FIG. 11A.

FIG. 11B illustrates a visual image 1120 of an embodiment of the back light unit of FIG. 11A. Specifically, the visual image 1120 is from an ~8×10 array of LEDs spaced 8 mm apart with a 200-micron-thick HH90 diffuser placed 7 mm above the LEDs with a 4 mm and a 3 mm PMMA layers between the LEDs and the HH90 diffuser 1102. In this embodiment, there is an additional pair of high index cross brightness enhancement films 1110, 1112 above the HH90 diffuser 1102, each film being about 200 microns in thickness.

Figure 11C:
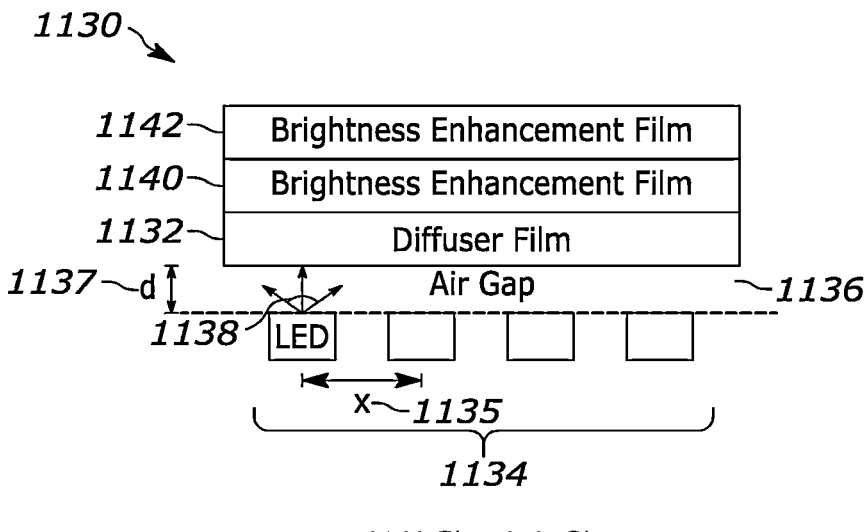
FIG. 11C illustrates a schematic of a layer structure for an embodiment of a back light unit having a double-sided diffuser layer over an air gap with an additional pair of high-index cross brightness enhancement films above the double-sided diffuser layer.

FIG. 11C illustrates a schematic of a layer structure 1130 for an embodiment of a back light unit having a double-sided diffuser layer 1132 over an air gap 1136 with an additional pair of high-index cross brightness enhancement films 1140, 1142 above the double-sided diffuser layer 1132. An LED array 1134 having element spacing of x 1135 is positioned underneath the air gap 1136. The air gap 1136 has thickness d 1137. The individual LEDs have angular distribution of light characterized by angle 1138.

Figure 11D:
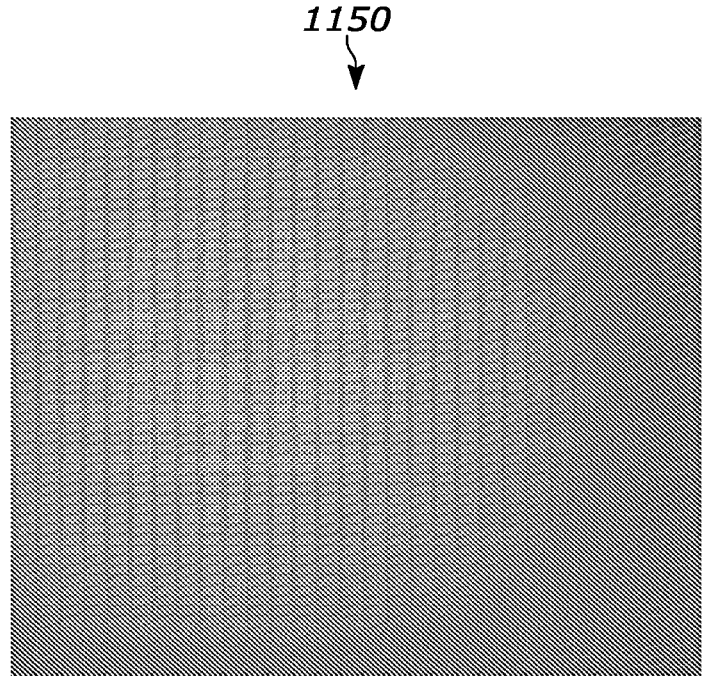
FIG. 11D illustrates a visual image of an embodiment of the back light unit of FIG. 11C.

FIG. 11D illustrates a visual image 1150 of an embodiment of the back light unit of FIG. 11C. Specifically, the visual image 1150 is from an ~8×10 array of LEDs spaced 8 mm apart with a 200-micron-thick HH90 diffuser 1132 placed 7 mm above the LEDs with air between the LEDs and the HH90 diffuser 1132. In this embodiment, there is an additional pair of high index cross brightness enhancement films 1140, 1142, each film being about 200 microns in thickness.

FIGS. 11B and 11D correspond to FIGS. 8B and 8D except that the DBEF has been removed. It can be observed in FIGS. 11B and 11D that the uniformity is worse for both the case of PMMA and an air gap. This is because the DBEF reflects ~50 percent of the light and this additional recirculated light improves the uniformity. The poorer uniformity without the DBEF can be compensated by increasing the thickness or the hiding strength of the diffuser. For example, a volumetric diffuser has larger hiding strength than a double-sided diffuser.

One feature of the present teaching is that a stronger hiding-strength diffuser can provide uniformity and/or dimming operation in a very thin back light unit. For example, FIGS. 12A-D illustrate backlight unit embodiments that use a volumetric diffuser layer with a full thickness half-max of 105 degrees. A volumetric diffuser layer has a high-hiding strength compared, for example, to a two-sided or single sided diffuser layer.

Figure 12A:
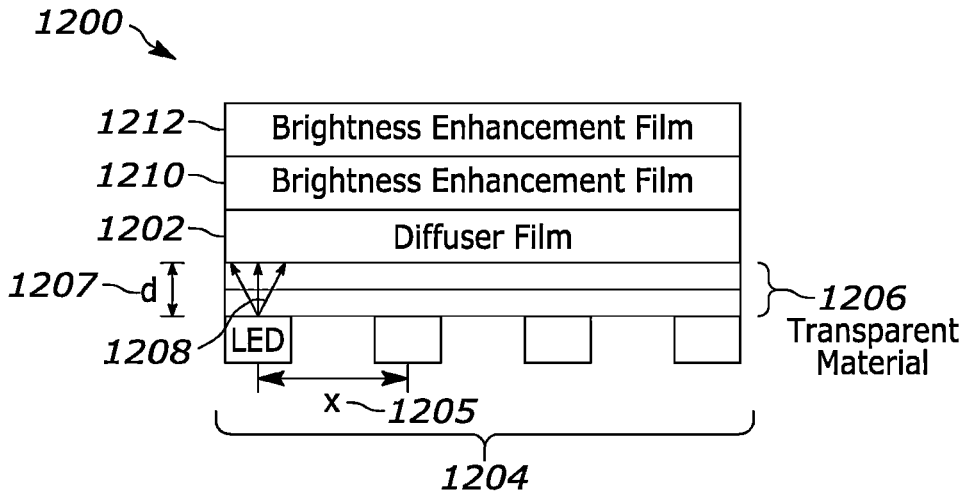
FIG. 12A illustrates a schematic of a layer structure for an embodiment of a back light unit having a volumetric diffuser layer over a transparent material layer with an additional pair of high-index cross brightness enhancement films above the volumetric diffuser layer.

FIG. 12A illustrates a schematic of a layer structure 1200 for an embodiment of a back light unit having a volumetric diffuser layer 1202 over a transparent material layer 1206 with an additional pair of high-index cross brightness enhancement films 1210, 1212 above the volumetric diffuser layer 1202. An LED array 1204 having element spacing of x 1205 is positioned underneath the transparent material layer 1206. The transparent material layer 1206 has thickness d 1207. The individual LEDs have angular distribution of light characterized by angle 1208.

Figure 12B:
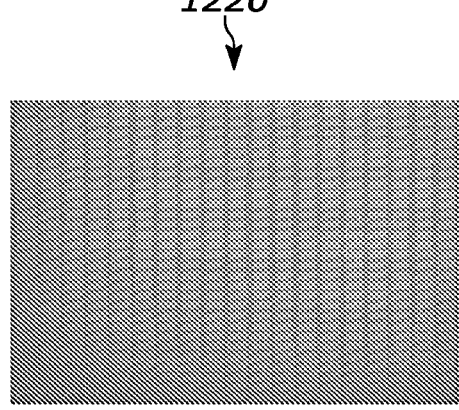
FIG. 12B illustrates a visual image of an embodiment of the back light unit of FIG. 12A.

FIG. 12B illustrates a visual image 1220 of an embodiment of the back light unit of FIG. 12A. Specifically, the visual image 1220 is from an ~8×10 array of LEDs spaced 8 mm apart with a 200-micron-thick VH105 diffuser 1202 placed 8 mm above the LEDs with a 4 mm and a 4 mm PMMA layers between the LEDs and the VH105 diffuser 1202. In this embodiment, there is an additional pair of high index cross brightness enhancement films 1210, 1212 above the VH105 diffuser 1202, each film being about 200 microns in thickness.

Figure 12C:
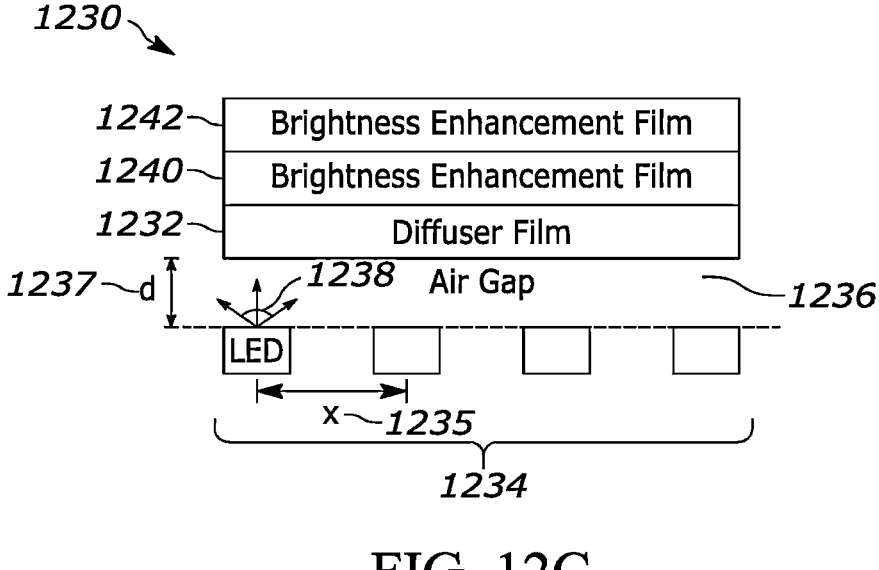
FIG. 12C illustrates a schematic of a layer structure for an embodiment of a back light unit having a volumetric diffuser layer over an air gap with an additional pair of high-index cross brightness enhancement films above the volumetric diffuser layer.

FIG. 12C illustrates a schematic of a layer structure 1230 for an embodiment of a back light unit having a volumetric diffuser layer 1232 over an air gap 1236 with an additional pair of high-index cross brightness enhancement films 1240, 1242 above the volumetric diffuser layer. An LED array 1234 having element spacing of x 1235 is positioned underneath the air gap 1236. The air gap 1236 has thickness d 1237. The individual LEDs have angular distribution of light characterized by angle 1238.

Figure 12D:
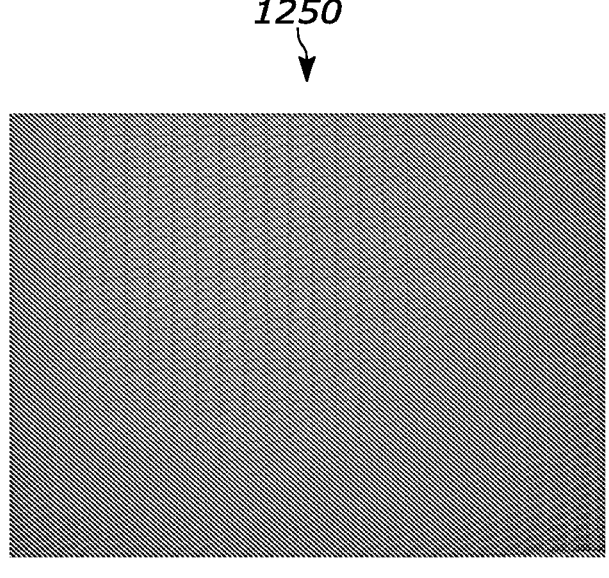
FIG. 12D illustrates a visual image of an embodiment of the back light unit of FIG. 12C.

FIG. 12D illustrates a visual image 1250 of an embodiment of the back light unit of FIG. 12C. Specifically, the visual image 1250 is from an ~8×10 array of LEDs spaced 8 mm apart with a 200-micron-thick VH105 diffuser 1232 placed 8 mm above the LEDs with air between the LEDs and the VH105 diffuser 1232. In this embodiment, there is an additional pair of high-index cross brightness enhancement films 1240, 1242, each film being about 200 microns in thickness. The visual image 1220 of FIG. 12B with the PMMA is visually brighter than the visual image 1250 of FIG. 12D with the air gap.

Figures 13A, 13B:
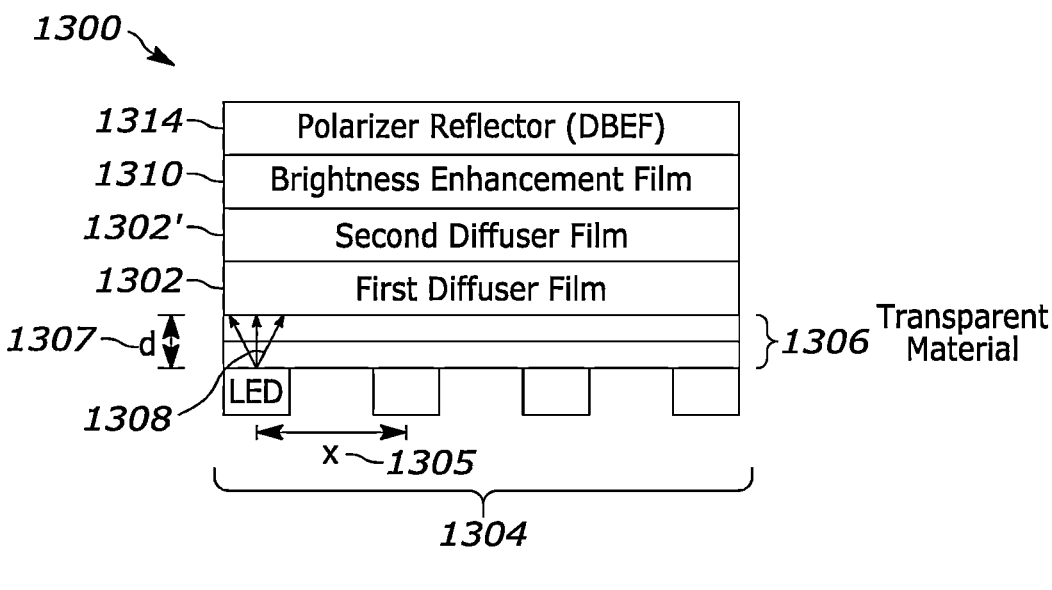
FIG. 13A illustrates a schematic of a layer structure for an embodiment of a back light unit having a volumetric diffuser layer over a transparent material layer, a second volumetric diffuser layer with an additional high-index cross brightness enhancement film and a polarizer reflector layer above the second volumetric diffuser layer.
FIG. 13B illustrates a visual image of an embodiment of the back light unit of FIG. 13A.

In some applications, it is desirable to use one BEF film in conjunction with a DBEF film instead of two cross BEF films. This results in more spreading of light in one direction as described in connection with the description of FIGS. 13A-D. FIG. 13A illustrates a schematic of a layer structure 1300 for an embodiment of a back light unit having a volumetric diffuser layer 1302 over a transparent material layer 1306, a second volumetric diffuser layer 1302' with an additional high-index cross brightness enhancement film 1310 and a polarizer reflector layer 1314 above the second volumetric diffuser layer 1302'. An LED array 1304 having element spacing of x 1305 is positioned underneath the transparent material layer 1306. The transparent material layer 1306 has thickness d 1307. The individual LEDs have angular distribution of light characterized by angle 1308.

FIG. 13B illustrates a visual image 1320 of an embodiment of the back light unit of FIG. 13A. Specifically, the visual image 1320 is from an ~8×10 array of LEDs spaced 8 mm apart with a 200-micron-thick VH105 diffuser 1302 placed 8 mm above the LEDs with a 4 mm and a 4 mm PMMA layer between the LEDs and the VH105 diffuser 1302. In this embodiment, there is an additional high index cross brightness enhancement films 1310 and a DBEF film 1314 above the VH105 diffuser 1302, each film being about 200 microns in thickness.

Figure 13C:
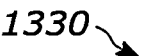
FIG. 13C illustrates a schematic of a layer structure for an embodiment of a back light unit having a volumetric diffuser layer over an air gap with an additional pair of high-index cross brightness enhancement films and a polarizer reflector film above the volumetric diffuser layer.
Figure 13C:
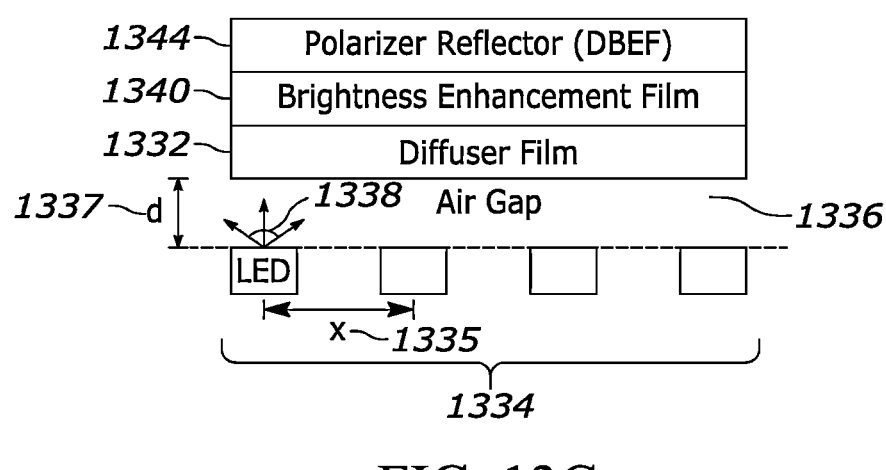

FIG. 13C illustrates a schematic of a layer structure 1330 for an embodiment of a back light unit having a volumetric diffuser layer 1332 over an air gap 1336 with an additional high-index cross brightness enhancement film 1340 and a polarizer reflector film 1344 above the volumetric diffuser layer 1332. An LED array 1334 having element spacing of x 1335 is positioned underneath the air gap 1336. The air gap 1336 has thickness d 1337. The individual LEDs have angular distribution of light characterized by angle 1338.

Figure 13D:
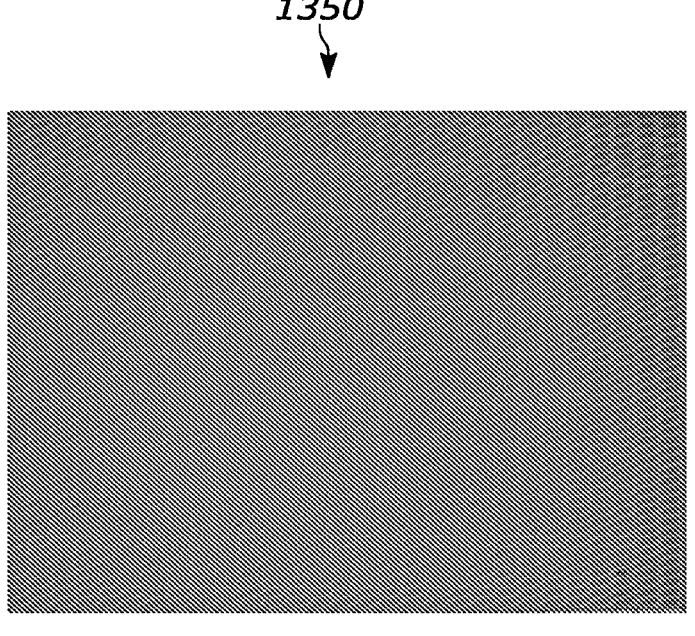
FIG. 13D illustrates a visual image of an embodiment of the back light unit of FIG. 13C.

FIG. 13D illustrates a visual image 1350 of an embodiment of the back light unit of FIG. 13C. Specifically, the visual image 1350 is from an ~8×10 array of LEDs spaced 8 mm apart with a 200-micron-thick VH105 diffuser 1332 placed 8 mm above the LEDs with air between the LEDs and the VH105 diffuser 1332. In this embodiment, there is an additional high-index cross brightness enhancement film 1340 and a DBEF film 1344, each film being about 200 microns in thickness. It can be observed comparing FIGS. 12A-D and 13A-D that the uniformity is only slightly worse when one BEF film is replaced with a DBEF film.

Figure 14A:
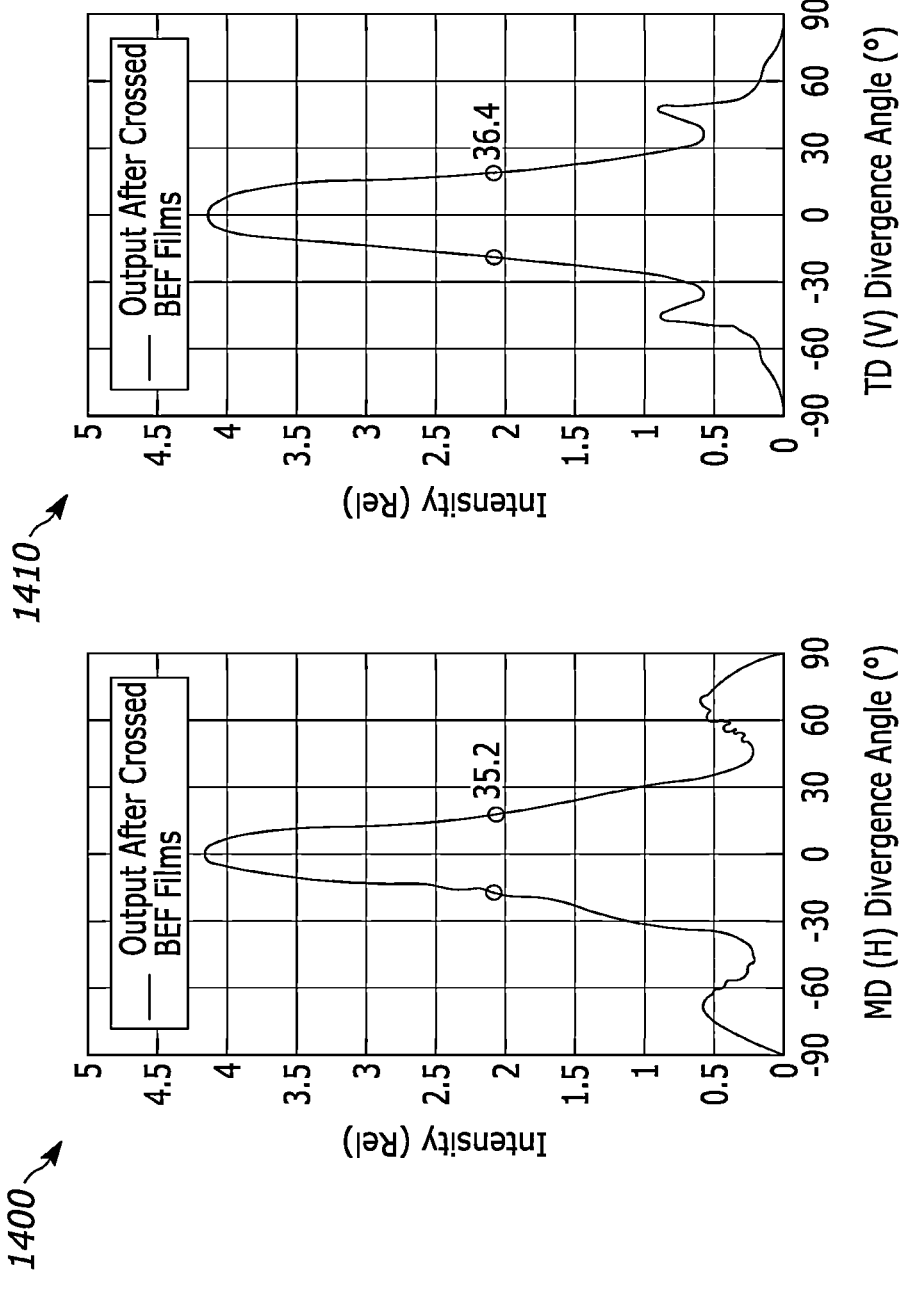
FIG. 14A illustrates a graph of intensity versus horizontal divergence angle, a graph of intensity versus vertical divergence angle, and a three-dimensional plot of a distribution of light and a projection of the three-dimensional plot of the distribution of light generated by a known LED passing through a pair of high-index cross brightness enhancement films and a polarizer reflector film used in embodiments of the present teaching.
Figure 14A:
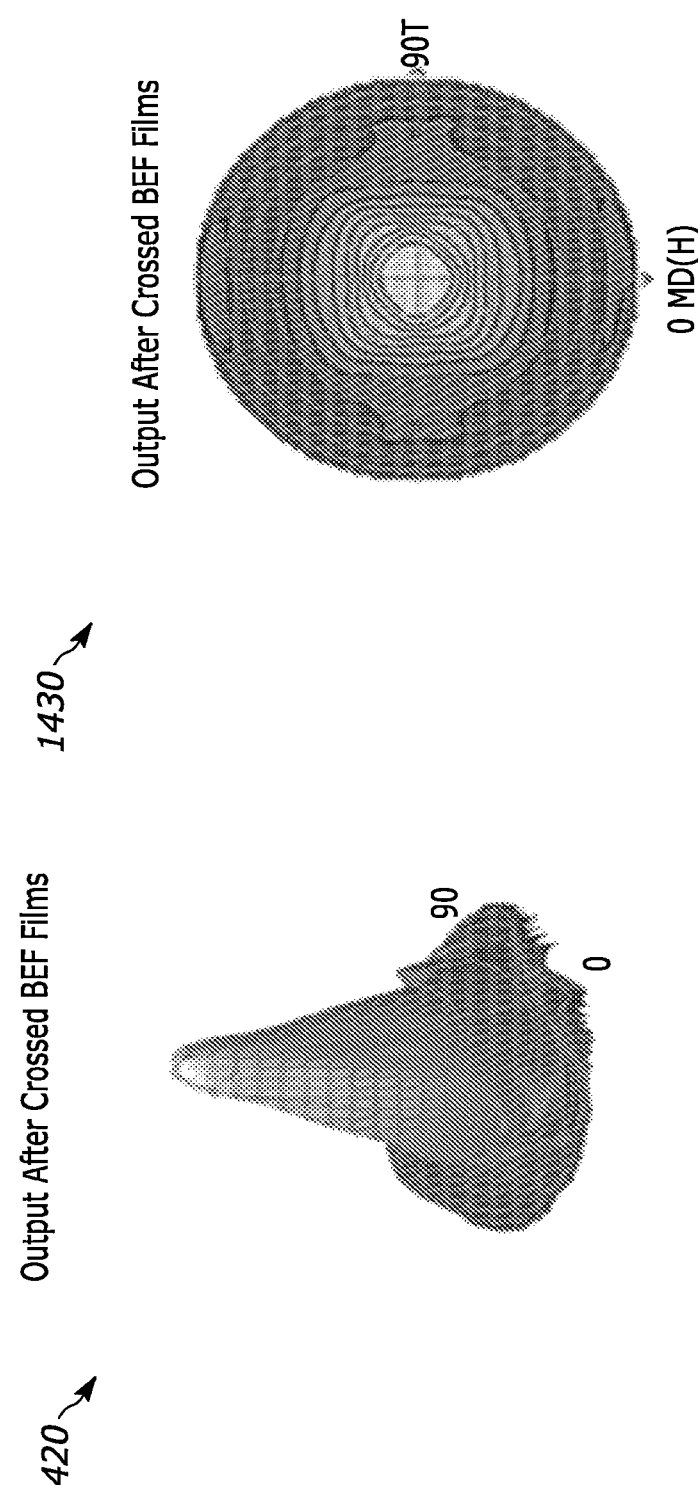

FIG. 14A illustrates a graph 1400 of intensity versus horizontal divergence angle, a graph 1410 of intensity versus vertical divergence angle, a three-dimensional plot 1420 of a distribution of light and a projection of the three-dimensional plot 1430 of the distribution of light generated by a known LED passing through a pair of high-index cross brightness enhancement films and a polarizer reflector film used in embodiments of the present teaching.

Figure 14B:
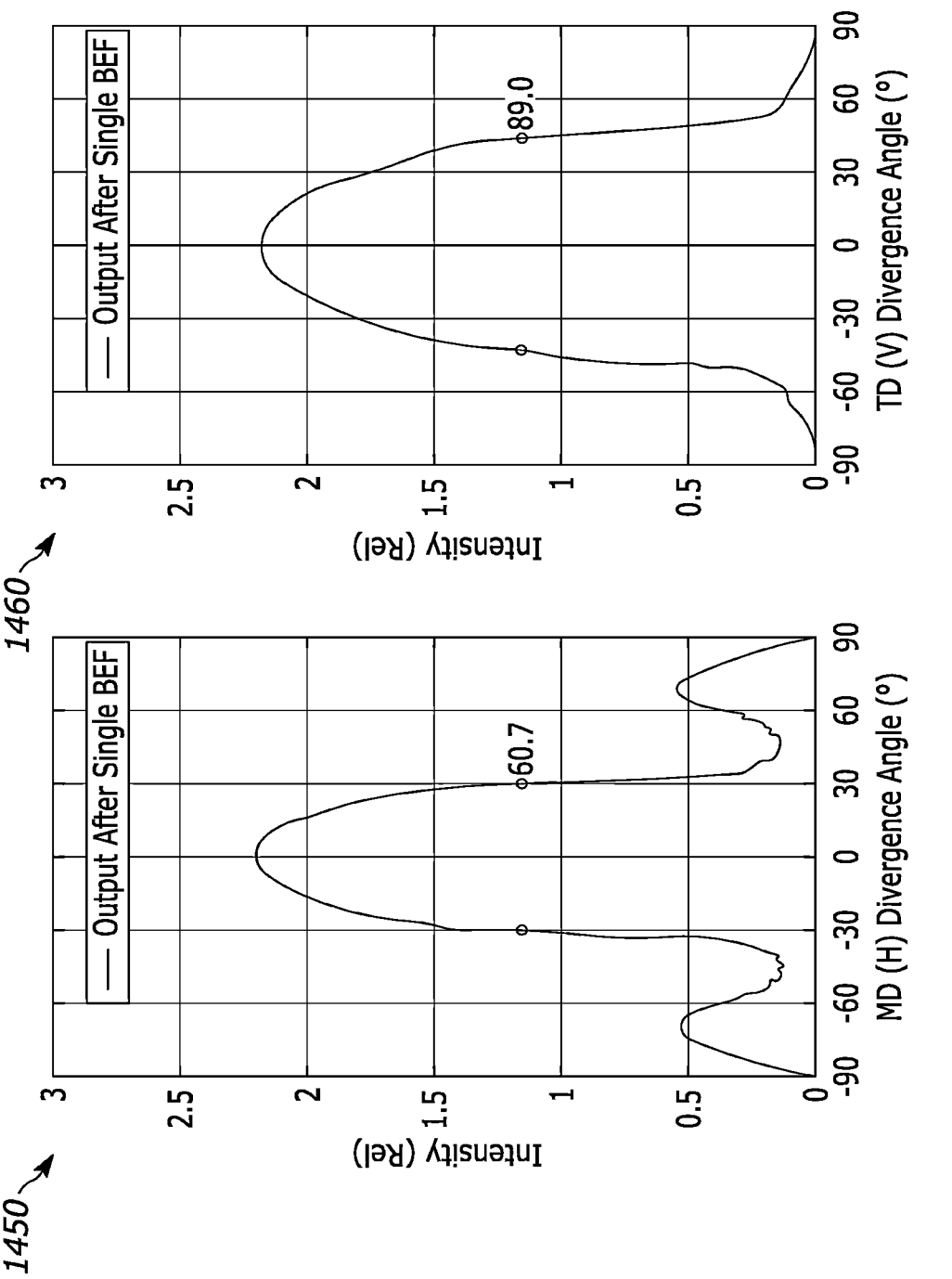
FIG. 14B illustrates a graph of intensity versus horizontal divergence angle, a graph of intensity versus vertical divergence angle, and a three-dimensional plot of a distribution of light and a projection of the three-dimensional plot of the distribution of light generated by a known LED passing through a single high-index brightness enhancement film and a polarizer reflector film used in embodiments of the present teaching.
Figure 14B:
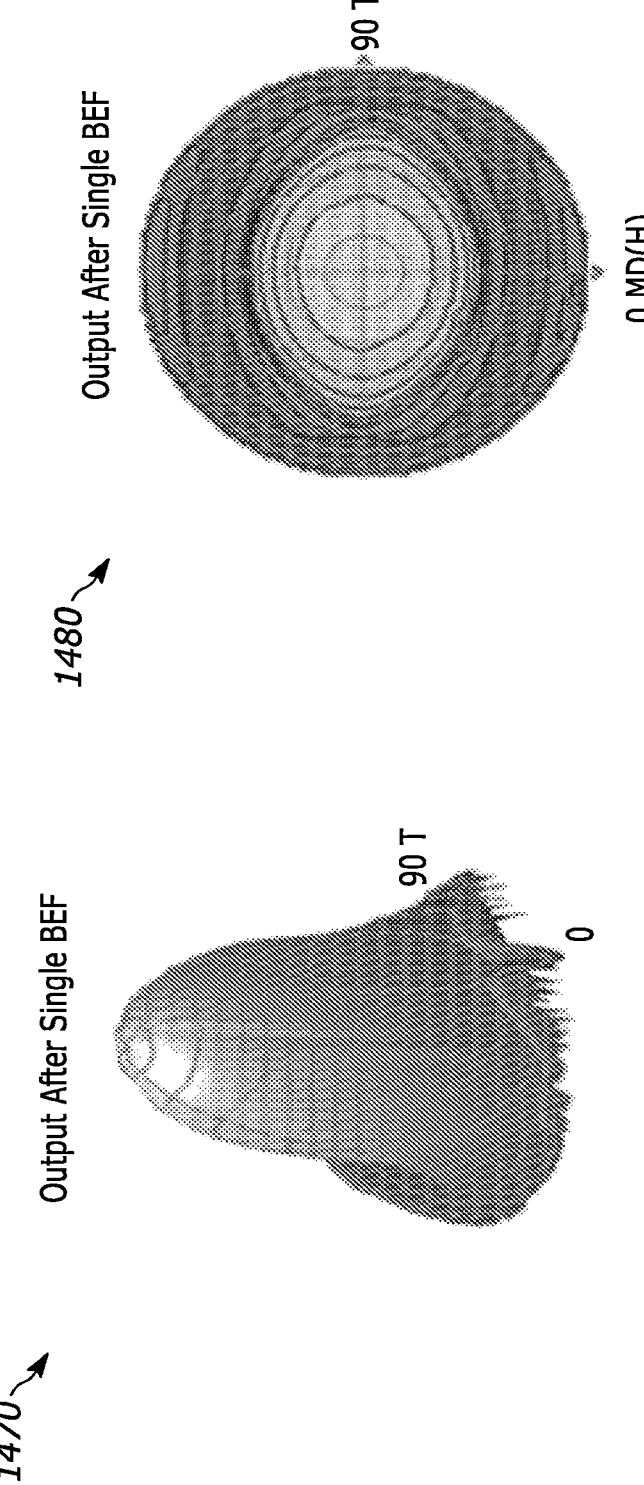

FIG. 14B illustrates a graph 1450 of intensity versus horizontal divergence angle, a graph 1460 of intensity versus vertical divergence angle, a three-dimensional plot 1470 of a distribution of light and a projection of the three-dimensional plot 1480 of the distribution of light generated by a known LED passing through a single high-index brightness enhancement film and a polarizer reflector film used in embodiments of the present teaching.

A feature of the present teaching is that an increase in brightness associated with the use of a transparent material layer is especially pronounced when the number of rows of LEDs in the narrow direction is less than 10 or 15. In some cases it may be desirable to tilt the optical distribution or widen it in one direction. This can be achieved by using a prismatic angle bend film above the crossed BEF films to tilt the distribution or an elliptical diffuser such as a BVT E40-01 to broaden the distribution in one direction.

In some display applications, thickness is not a major constraint but it is desirable to use a mini-LED array in order to achieve higher brightness and to use local dimming. One option can be to use technology similar to lighting where an air gap is used between the LEDs and a strong diffuser to achieve excellent uniformity. One feature of the present teaching is the realization that using a solid transparent material with a refractive index between 1.4 and 1.7 is advantageous instead of an air gap. When used in conjunction with two crossed brightness enhancing films (e.g. ~90-degree apex angle prisms referred to as BEF) and a DBEF film (a reflecting polarizer) that a back light unit with excellent uniformity, brightness and a good point spread function for local dimming results.

In some embodiments, the back light unit includes the following: an array of mini-LEDs; a layer of transparent solid material such as PMMA or polycarbonate; a strong diffuser (preferably with a full width half max when measured with collimated light angle of >60 degrees and even better 80 or 100 degrees); and a pair of high indices cross BEF films and a DBEF film. In some embodiments, the solid transparent material represents at least 50%, and preferably >70%, of the height from the top of the LEDs to the top film in the BLU. In some embodiments there can be additional films above the cross BEF films to further shape or redirect the beam. In some embodiments, one of the BEF films or the DBEF is omitted. Also, in some embodiments, the narrow dimension of the back light unit may consist of less than 15 LED rows or even less than 10 LED rows.

EQUIVALENTS

While the Applicant's teaching is described in conjunction with various embodiments, it is not intended that the applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A back light unit comprising:
   a) a two-dimensional array of light emitting diodes (LEDs), at least one LED in the two-dimensional array generating light with an angular distribution of nominally ±90 degrees around a center of the at least one LED;
   b) a diffuser film positioned adjacent to the two-dimensional array of LEDs in a direction of propagation of light generated by the two-dimensional array of LEDs and spaced apart from the two-dimensional array of LEDs with an air gap, the diffuser film configured to provide light with a full width at half max of greater than 60 degrees and configured to diffuse the light generated by the two-dimensional array of LEDs;
   c) a brightness enhancement film positioned in a path of light generated by the two-dimensional array of LEDs, and comprising a plurality of prism microstructures on at least one surface, wherein at least some prism microstructures have an apex angle of approximately ninety degrees; and
   d) a polarizer reflector film positioned in the path of light generated by the two-dimensional array of LEDs and configured to transmit one polarization and to reflect another polarization to improve uniformity of light output from the back light unit.

2. The back light unit of claim 1, further comprising a second diffuser film positioned in the path of light generated by the two-dimensional array of LEDs.

3. The back light unit of claim 1, further comprising a second brightness enhancement film positioned in the path of light generated by the two-dimensional array of LEDs.

4. The back light unit of claim 3, further comprising a second polarizer reflector film positioned in the path of light generated by the two-dimensional array of LEDs.

5. The back light unit of claim 1, further comprising a prismatic angle bend film positioned over the polarizer reflector film and configured to tilt a light distribution of the light output from the back light unit.

6. The back light unit of claim 1, further comprising an elliptical diffuser film positioned over the polarizer reflector film, the elliptical diffuser film being configured to broaden a light distribution of the light output from the back light unit in one direction.

7. The back light unit of claim 1, wherein the polarizer reflector film is positioned over the brightness enhancement film, the polarizer reflector film being configured to improve uniformity of the light output from the back light unit.

8. The back light unit of claim 1, wherein the brightness enhancement film comprises a pair of cross brightness enhancement films.

9. The back light unit of claim 1, further comprising at least one additional film positioned above the brightness enhancement films.

10. The back light unit of claim 9, wherein the at least one additional film is configured to further shape the light from the back light unit.

11. The back light unit of claim 9, wherein the at least one additional film is configured to redirect the light from the back light unit.

12. The back light unit of claim 1, wherein a number of rows in the two-dimensional array of LEDs is less than a number of columns in the two-dimensional array.

13. The back light unit of claim 1, wherein the two-dimensional array of LEDs comprises a row spacing of 8 mm and a column spacing of 8 mm.

14. The back light unit of claim 1, wherein the two-dimensional array of LEDs comprises ten rows and eight columns.

15. The back light unit of claim 1, wherein the two-dimensional array of LEDs comprises less than or equal to fifteen rows and greater than or equal to fifteen columns.

16. The back light unit of claim 1, wherein a number of rows in the two-dimensional array of LEDs is less than or equal to fifteen.

17. The back light unit of claim 1, wherein the two-dimensional array of LEDs comprises less than or equal to ten rows and greater than or equal to ten columns.

18. The back light unit of claim 1, wherein the diffuser film comprises the full width at half max of greater than 80 degrees.

19. The back light unit of claim 1, wherein the diffuser film comprises the full width at half max of greater than 100 degrees.

* * * * *